United States Patent
Abe et al.

(10) Patent No.: US 11,614,930 B2
(45) Date of Patent: Mar. 28, 2023

(54) CENTER DEVICE, VEHICLE ELECTRONIC CONTROL SYSTEM, PROGRAM UPDATE PROGRESS CONTROL METHOD, AND PROGRAM UPDATE PROGRESS CONTROL PROGRAM

(71) Applicant: DENSO CORPORATION, Kariya (JP)

(72) Inventors: Taiji Abe, Kariya (JP); Nao Sakurai, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 17/093,691

(22) Filed: Nov. 10, 2020

(65) Prior Publication Data

US 2021/0149659 A1 May 20, 2021

(30) Foreign Application Priority Data

Nov. 14, 2019 (JP) .............................. JP2019-206197

(51) Int. Cl.
| | |
|---|---|
| G06F 8/65 | (2018.01) |
| H04W 4/44 | (2018.01) |
| G07C 5/00 | (2006.01) |
| G06F 9/38 | (2018.01) |

(52) U.S. Cl.
CPC .............. *G06F 8/65* (2013.01); *G06F 9/3836* (2013.01); *G07C 5/008* (2013.01); *H04W 4/44* (2018.02)

(58) Field of Classification Search
CPC ........................................................ G06F 8/60
See application file for complete search history.

(56) References Cited

U.S. PATENT DOCUMENTS

| | | | | |
|---|---|---|---|---|
| 5,361,207 A | * | 11/1994 | Hayafune | ............... F16H 59/66 |
| | | | | 477/901 |
| 10,567,223 B1 | * | 2/2020 | Sidaraddi | ............ H04L 41/0859 |
| 11,175,906 B2 | * | 11/2021 | Jeong | ..................... G07C 5/008 |
| 2001/0029576 A1 | * | 10/2001 | Hatakeyama | ......... G06F 9/4494 |
| | | | | 712/201 |
| 2003/0181242 A1 | * | 9/2003 | Lee | ....................... A63F 13/792 |
| | | | | 463/42 |

(Continued)

FOREIGN PATENT DOCUMENTS

| | | |
|---|---|---|
| JP | 2003-196098 A | 7/2003 |
| JP | 2004-038616 A | 2/2004 |

(Continued)

*Primary Examiner* — Jae U Jeon
(74) *Attorney, Agent, or Firm* — Harness, Dickey & Pierce, P.L.C.

(57) ABSTRACT

A vehicle electronic control system includes a center device and a vehicle master device. The center device includes: a campaign information obtainer obtaining campaign information of a program update; a vehicle state obtainer obtaining a vehicle state of a target vehicle of the program update; an execution requirement setter setting an execution requirement of a phase in the program update based on the campaign information obtained by the campaign information obtainer and the vehicle state obtained by the vehicle information obtainer; an execution requirement notifier notifying the vehicle master device of the execution requirement set by the execution requirement setter; and an update data deliverer delivering the update data to the vehicle master device.

19 Claims, 23 Drawing Sheets

(56) References Cited

U.S. PATENT DOCUMENTS

| | | | |
|---|---|---|---|
| 2012/0159471 A1* | 6/2012 | De Souza | G06F 9/44521 717/178 |
| 2015/0056976 A1* | 2/2015 | Ukai | H04W 48/04 455/418 |
| 2015/0113520 A1* | 4/2015 | Kotani | G06F 11/1433 717/172 |
| 2015/0186548 A1* | 7/2015 | Chun | G07C 5/008 707/769 |
| 2015/0271247 A1* | 9/2015 | Patsiokas | H04L 69/14 709/217 |
| 2017/0262277 A1 | 9/2017 | Endo et al. | |
| 2018/0365135 A1* | 12/2018 | Lake | G06F 11/3688 |
| 2020/0042306 A1* | 2/2020 | Kiyama | H04L 67/34 |
| 2021/0120088 A1* | 4/2021 | Barton | H04L 41/0886 |
| 2021/0174667 A1* | 6/2021 | Kimura | G01H 17/00 |

FOREIGN PATENT DOCUMENTS

| | | |
|---|---|---|
| JP | 2018-005894 A | 1/2018 |
| JP | 2018-125039 A | 8/2018 |

\* cited by examiner

FIG. 21

DELIVERY PLAN TABLE

| VEHICLE ID | ... | AUG 31 | | | SEPT 1 | | | SEPT 2 | | | ... |
|---|---|---|---|---|---|---|---|---|---|---|---|
| | | 9:00–12:00 | 12:00–15:00 | 15:00–18:00 | 9:00–12:00 | 12:00–15:00 | 15:00–18:00 | 9:00–12:00 | 12:00–15:00 | 15:00–18:00 | |
| 1001–1100 | | | | | DELIVERY | | | | | | |
| 1101–1200 | | | | | | DELIVERY | | | | | |
| 1201–1300 | | | | | | | DELIVERY | | | | |
| 1301–1400 | | | | | | | | DELIVERY | | | |
| 1401–1500 | | | | | | | | | DELIVERY | | |
| ... | | | | | | | | | | | |

CENTER DEVICE, VEHICLE ELECTRONIC CONTROL SYSTEM, PROGRAM UPDATE PROGRESS CONTROL METHOD, AND PROGRAM UPDATE PROGRESS CONTROL PROGRAM

CROSS REFERENCE TO RELATED APPLICATION

The present application is based on and claims the benefit of priority of Japanese Patent Application No. 2019-206197, filed on Nov. 14, 2019, the disclosure of which is incorporated herein by reference.

TECHNICAL FIELD

The present disclosure generally relates to a center device, a vehicle electronic control system, a program update progress control method, and a program update progress control program.

BACKGROUND INFORMATION

In recent years, along with diversification of vehicle control such as a driving support function and an automatic driving function, the scale/size of the program is increasing in an electronic control device (hereinafter may also be referred to as ECU (Electronic Control Unit)) for the vehicle control, diagnosis and the like. In addition, as a present version of the program becoming outdated due to functional improvement and the like of the program, there are increasing opportunities to rewrite ("reprog" or reprogram) the program in the ECU. On the other hand, with the development of communication network technologies, technologies related to connected cars are also prevailing. Under these circumstances, OTA (Over The Air) technology for re-write/overwrite programs in the target ECU in the vehicle are enabled by (i) having a vehicle master device as a relay device on the vehicle side and (ii) delivering the update data downloaded wirelessly from the center device to the target ECU by using the vehicle master device.

SUMMARY

It is an object of the present disclosure to provide a center device capable of appropriately performing program updates, and also to provide a vehicle electronic control system, a program update progress control method, and a program update progress control program.

According to one aspect of the disclosure, a center device (3) having a campaign information obtainer (3a) obtains program update campaign information. A vehicle state obtainer (3b) obtains a vehicle state of a target vehicle for which the program is updated. When the campaign information is obtained by the campaign information obtainer and the vehicle state is obtained by the vehicle state obtainer (3b), an execution requirement setter (3c) sets execution requirements for a phase of the program update based on the obtained campaign information and vehicle state. When the execution requirement setter sets the execution requirements, an execution requirement notifier (3d) notifies the vehicle master device of the set execution requirements. An update data deliverer (3e) delivers the update data to the vehicle master device.

BRIEF DESCRIPTION OF THE DRAWINGS

Objects, features, and advantages of the present disclosure will become more apparent from the following detailed description made with reference to the accompanying drawings, in which:

FIG. 16 is a diagram of a screen when IG is turned ON;

FIG. 21 is a diagram of a delivery plan table;

DETAILED DESCRIPTION

Hereinafter, an embodiment of the present disclosure is described with reference to the drawings. A vehicle program rewrite system (corresponding to an in-vehicle electronic control system) is a system in which application programs for vehicle control, diagnosis and the like installed in an electronic control device (hereinafter referred to as an ECU (Electronic Control Unit)) are updatable/rewritable by OTA (Over The Air). In the present embodiment, an example where an application program is rewritten (i.e., updated) by wire or wirelessly is described. However, the present disclosure is applicable to a case where data used by various applications such as map data used by a map application and control parameters used by the ECU are rewritten by wire or wirelessly.

Rewriting of an application program by wire (i.e., via wired connection) includes not only rewriting of the program by obtaining the (new) application program (or new portions) from outside the vehicle via wired connection, but also rewriting by obtaining various data used in an execution of the application program from outside the vehicle via wired connection. Rewriting of the application program wirelessly (e.g., OTA) includes not only rewriting of the program by obtaining the (new) application program wirelessly from outside the vehicle, but also rewriting by obtaining various data used in an execution of the application program from outside the vehicle via wireless communication.

Figure 1:
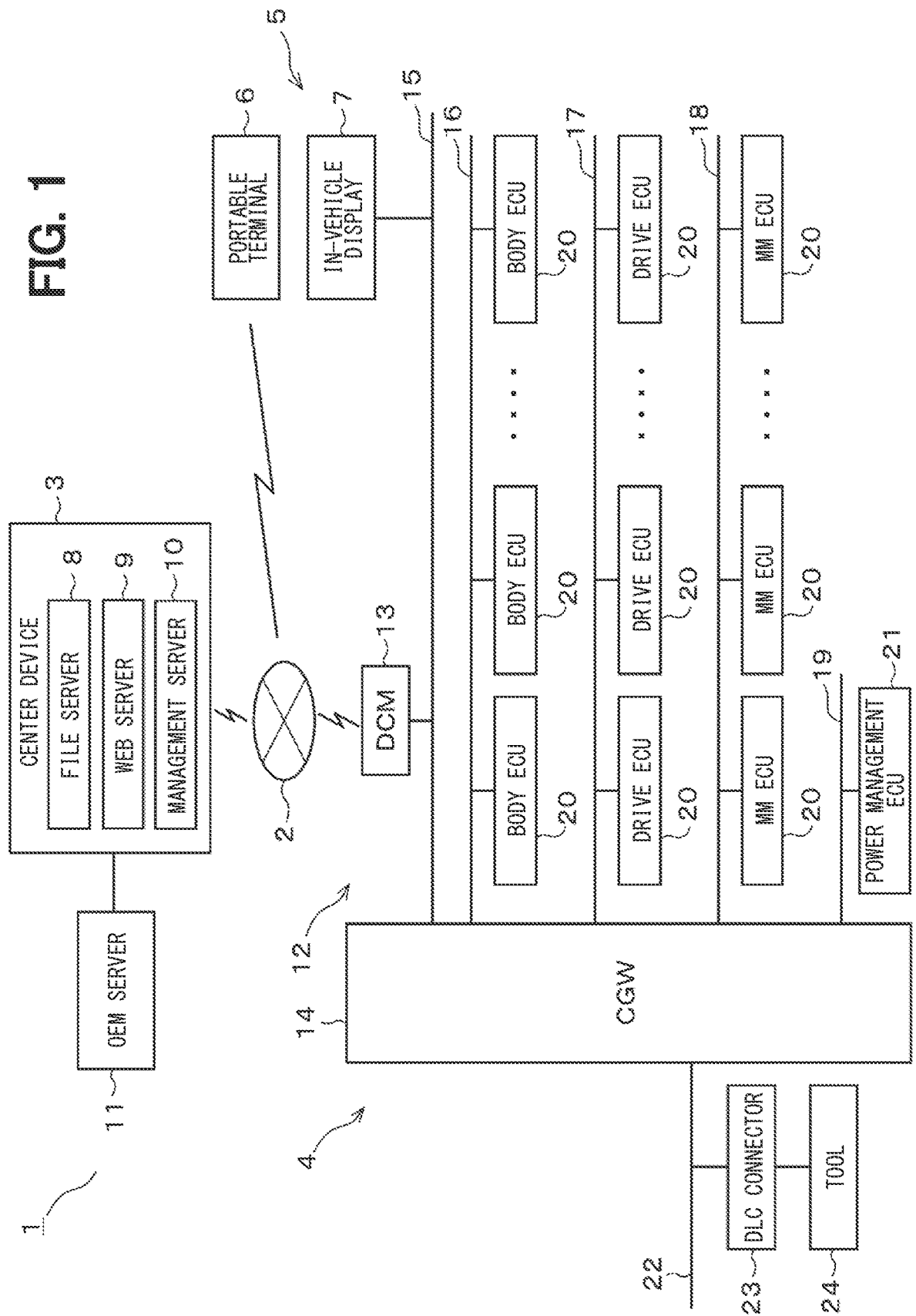
FIG. 1 is a diagram of an overall configuration of an embodiment.

As shown in FIG. 1, a vehicle program rewrite system 1 includes a center device 3 on a communication network 2 (i.e., on the network side), a vehicle system 4 provided in the vehicle, and a display terminal 5. The communication network 2 is configured to include a mobile communication network such as a 4G line, the Internet, and Wi-Fi (Wireless Fidelity) (registered trademark).

The display terminal 5 is a terminal having a function of receiving an operation input from a user and a function of displaying various screens, and is, for example, a portable terminal 6 such as a smartphone or a tablet that can be carried by the user, or is an in-vehicle display 7 arranged in a vehicle interior. The portable terminal 6 can perform data communication with the center device 3 via the communication network 2 as long as it is within a communication range of a mobile communication network. The in-vehicle display 7 is connected to the vehicle system 4, and may have a configuration that provides a navigation function. Further, the in-vehicle display 7 may also be an in-vehicle display ECU having a function of an ECU, or may have a function of controlling display on an center display, a meter display or the like.

A user is enabled to, if within a communication range of the mobile communication network and outside the vehicle, confirm various screens involved in rewriting the application program by the portable terminal 6 together with an operation input, and perform a procedure involved in rewriting the application program. In the vehicle interior, the user can perform an operation input while confirming various screens involved in rewriting the application program on the in-vehicle display 7, and can perform a procedure involved in rewriting the application program. That is, the user can properly use either the portable terminal 6 or the in-vehicle display 7 in or outside the vehicle compartment to perform a procedure involved in rewriting the application program.

The center device 3 controls a program update function on the communication network 2 side in the vehicle program rewrite system 1 and functions as an OTA center. The center device 3 has a file server 8, a web server 9, and a management server 10, and is configured such that a plurality of servers 8 to 10 having different functions can mutually perform data communication. Further, the center device 3 is data-communicably connected to an OEM server 11 managed by an OEM (i.e., Original Equipment Manufacturer).

The file server 8 is a server that manages files of application programs delivered from the center device 3 to the vehicle system 4. The file server 8 manages (i) update data provided by a supplier or the like who is a provider of the application program delivered from the center device 3 to the vehicle system 4, (ii) delivery specifications provided by an OEM, (Original Equipment Manufacturer), (iii) vehicle state obtained from the vehicle system 4, and the like. The file server 8 is capable of performing data communication with the vehicle system 4 via the communication network 2, and, when a delivery package download request occurs, the file server 8 transmits a delivery package to the vehicle system 4, in which reprog data and delivery specification data are packaged into one file.

The web server 9 is a server that manages web information. The web server 9 transmits web data managed by itself in response to a request from a web browser included in the portable terminal 6 or the like. The management server 10 is a server that manages personal information of users registered in the application program rewriting service, rewriting history of the application program for each vehicle, and the like.

The vehicle system 4 has a master device 12 (corresponding to a vehicle master device). The master device 12 has a DCM (Data Communication Module) 13 and a CGW (Central Gate Way) 14. Data communication is possible between the DCM 13 and the CGW 14 via a first bus 15. The DCM 13 performs data communication with the center device 3 via the communication network 2. When the delivery package is downloaded from the file server 8, the DCM 13 extracts write data from the downloaded delivery package, and transfers the extracted write data to the CGW 14.

When the CGW 14 has a data relay function and obtains the write data from the DCM 13, the CGW 14 instructs the rewrite target ECU that is a rewriting target of the application program to write the obtained write data, and delivers the write data to the rewrite target ECU. Further, when the writing of the write data is complete in the rewrite target ECU and the rewriting of the application program is complete, the CGW 14 instructs the rewrite target ECU to activate the rewrite-complete application program.

The master device 12 controls the program update function on the vehicle side in the vehicle program rewrite system 1, and functions as an OTA master. Note that, in FIG. 1, a configuration is illustrated in which the DCM 13 and the in-vehicle display 7 are connected to the same first bus 15. However, a configuration in which the DCM 13 and the in-vehicle display 7 are connected to different buses may also be used. Further, the CGW 14 may have a part or all of the functions of the DCM 13, or the DCM 13 may have a part or all of the functions of the CGW 14. That is, in the master device 12, the function sharing between the DCM 13 and the CGW 14 may be arbitrarily configurable. The master device 12 may be composed of two ECUs of the DCM 13 and the CGW 14, or may be composed of one integrated ECU having the function of the DCM 13 and the function of the CGW 14.

In addition to the first bus 15, a second bus 16, a third bus 17, a fourth bus 18, and a fifth bus 19 are connected to the CGW 14 as buses inside the vehicle for connection to various ECUs 20 via the buses 16 to 18, and a power management ECU 21 is connected via the bus 19.

The second bus 15 is, for example, a body-system network bus. The ECU 20 connected to the second bus 16 is an ECU that controls the body system. The ECU that controls the body system includes, for example, a door ECU that controls lock/unlock of a door, a meter ECU that controls display on a meter display, an air conditioner ECU that controls driving of an air conditioner, a window ECU that controls opening/closing of a window, a security ECU that is driven to prevent the vehicle from being stolen, and the like.

The third bus 17 is, for example, a drive-system network bus. The ECU 20 connected to the third bus 17 is an ECU that controls the drive system. The ECU that controls the drive system includes, for example, an engine ECU that controls a drive of an engine, a brake ECU that controls a drive of a brake, an ECT (Electronic Controlled Transmission) ECU that controls a drive of an automatic transmission, a power steering ECU that controls a drive of a power steering and the like.

The fourth bus 18 is, for example, a multimedia-system network bus. The ECU 20 connected to the fourth bus 18 is an ECU that controls multimedia systems. The ECU for controlling the multimedia system includes, for example, a navigation ECU for controlling a navigation system, an ETC ECU for controlling an electronic toll collection system (ETC) (registered trademark), and the like. The buses 16 to 18 may also be buses of a system other than the bus of the body network, the bus of the traveling network, and the bus of the multimedia network. Further, the number of buses and the number of ECUs 20 are not limited to the illustrated configuration. The power management ECU 21 is an ECU that manages power supply to the DCM 13, the CGW 14, various ECUs 20, and the like.

The sixth bus 22 is connected to the CGW 14 as a bus outside the vehicle. A DLC (Data Link Coupler) connector 23 to which a tool 24 is detachably connected is connected to the sixth bus 22. The buses 15 to 19 on the inside of the vehicle and the buses 22 on the outside of the vehicle are configured by CAN (Controller Area Network, registered trademark) buses, for example, and the CGW 14 conducts data communication between the DCM 13, the various ECUs 20, and a tool 24 in accordance with data communication standards and diagnostic communication standards (UDS (Unified Diagnosis Services): ISO 14229). Note that the DCM 13 and the CGW 14 may be connected via Ethernet, or a DLC connector 23 and the CGW 14 may be connected via Ethernet.

When the rewrite target ECU 20 receives write data from the CGW 14, the rewrite target ECU 20 rewrites the application program by writing the received write data in a flash memory. In the above-described configuration, the CGW 14 functions as a reprog master that delivers the write data to the rewrite target ECU 20 when receiving a write data obtain request from the rewrite target ECU 20. When the rewrite target ECU 20 receives the write data from the CGW 14, the rewrite target ECU 20 functions as a reprog slave that writes the received write data in the flash memory and rewrites the application program.

As modes of rewriting the application program, there are: a mode of rewriting by wire, and a mode of rewriting by wireless communication. The mode in which the application program is rewritten by wire is a mode in which the rewrite target ECU 20 is rewritten by using the application program obtained from the outside of the vehicle via wired connection. Specifically, when the tool 24 is connected to the DLC connector 23, the tool 24 transfers the write data to the CGW 14. The CGW 14 functions as a gateway, transmits a wired rewrite request to the rewrite target ECU 20, instructs the rewrite target ECU 20 to write (i.e., install) the write data, and delivers the write data transferred from the tool 24 to the rewrite target ECU 20. Delivering the write data to the rewrite target ECU 20 is, i.e., means, relaying the write data.

The mode of wirelessly rewriting the application program is a mode of rewriting the ECU 20 to be rewritten by using the application program that has been wirelessly obtained from outside the vehicle. Specifically, when the delivery package is downloaded from the file server 8, the DCM 13 extracts the write data from the downloaded delivery package and transfers the write data to the CGW 14. The CGW 14 functions as a rewriting tool, instructs the rewrite target ECU 20 to write (i.e., install) the write data, and delivers the write data transferred from the DCM 13 to the rewrite target ECU 20.

As modes for diagnosing the ECU 20, there are a mode for diagnosing by wire (i.e., via wired connection) and a mode for diagnosing wirelessly (i.e., via wireless connection). In the mode of diagnosing the ECU 20 by wire, the ECU 20 is diagnosed from the outside of the vehicle via wired connection. Specifically, when the tool 24 is connected to the DLC connector 23, the tool 24 transfers a diagnostic request to the CGW 14. The CGW 14 functions as a gateway, transmits the diagnosis request to a diagnosis target ECU 20, and delivers a diagnosis command transferred from the tool 24 to the diagnosis target ECU 20. The diagnosis target ECU 20 performs a diagnosis process according to the diagnosis command received from the CGW 14.

In the mode of diagnosing the ECU 20 wirelessly, the ECU 20 is diagnosed wirelessly from outside the vehicle. Specifically, when the diagnosis command is transmitted from the center device 3 to the DCM 13 as a diagnostic request, the DCM 13 transfers the diagnosis command to the CGW 14. The CGW 14 functions as a gateway, and delivers the diagnosis command as a diagnostic request to the diagnostic target ECU 20. The diagnosis target ECU performs a diagnosis process according to the diagnosis command received from the CGW 14.

Figure 2:
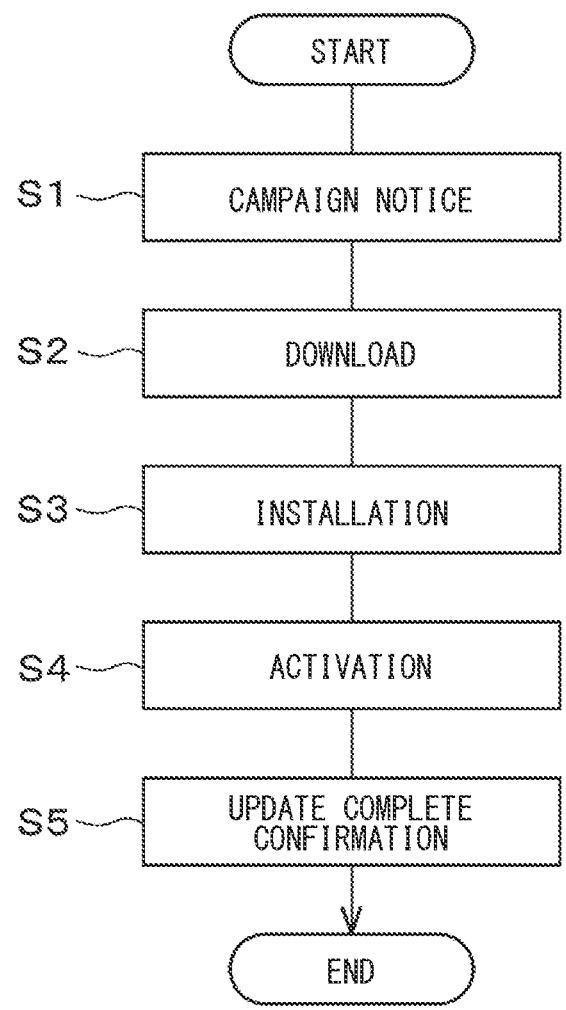
FIG. 2 is a diagram of phases in program update.

In the configuration in which the application program of the rewrite target ECU 20 is rewritten by OTA, the program update is divided into a plurality of phases, and the phases are advanced stepwise to complete the program update. Specifically, as shown in FIG. 2, phases including campaign notice (S1), download (S2), installation (S3), activation (S4), and update complete confirmation (S5) are sequentially performed. In the campaign notice phase, the center device 3 delivers the campaign information to the vehicle system 4. In the download phase, the center device 3 delivers the delivery package including the write data to the vehicle system 4. In the installation phase, the CGW 14 instructs the rewrite target ECU 20 to write the write data. In the activation phase, the rewrite target ECU 20 validates the write data. In the update complete confirmation phase, the completion of program update is notified.

Screens displayed on the display terminal 5 in those phases are described with reference to FIGS. 3 to 18. After a target vehicle of the program update is delivered from the yard to the user, basically, the user can proceed to the next phase by performing an acceptance operation in the phase. That is, in the campaign notice phase, the user can proceed to the download phase by performing a download acceptance operation. In the download phase, the user can proceed to the installation phase by performing an installation accepting operation. In the installation phase, the user can proceed to the activation phase by performing the activation accepting operation. Even after the target vehicle for program update is delivered from the yard to the user, in case of emergency situation or if the user has left/postponed the accepting operation for along time, or even in other cases, it may be possible to proceed to the next phase without accepting operation performed by the user. The yard here means a place where the vehicle is managed in a state in which the vehicle is not in possession of the user, which may include places like a manufacturing factory where the vehicles are stored after manufacturing and before shipping, a transportation ship or transportation vehicle to transport vehicles from the factory, maintenance shops and dealers where the vehicles are stored for maintenance and inspection after shipment and the like.

Figure 3:
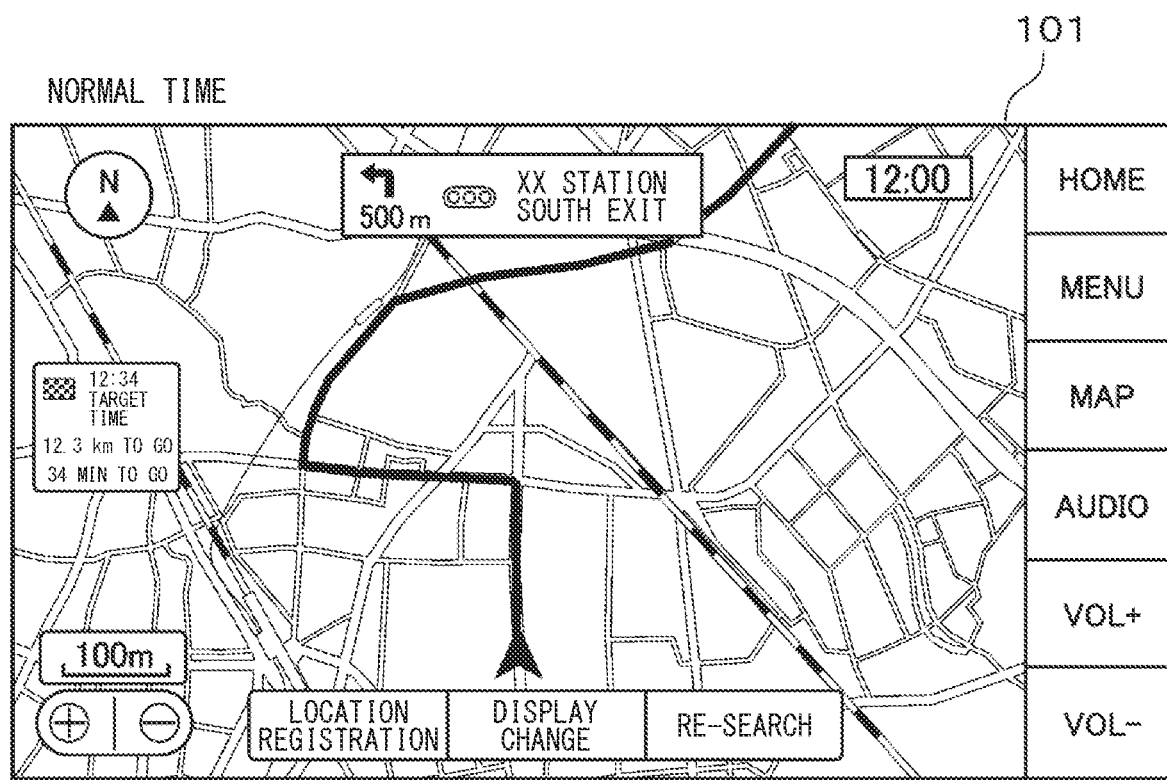
FIG. 3 is a diagram of a screen in a normal time.
Figure 4:
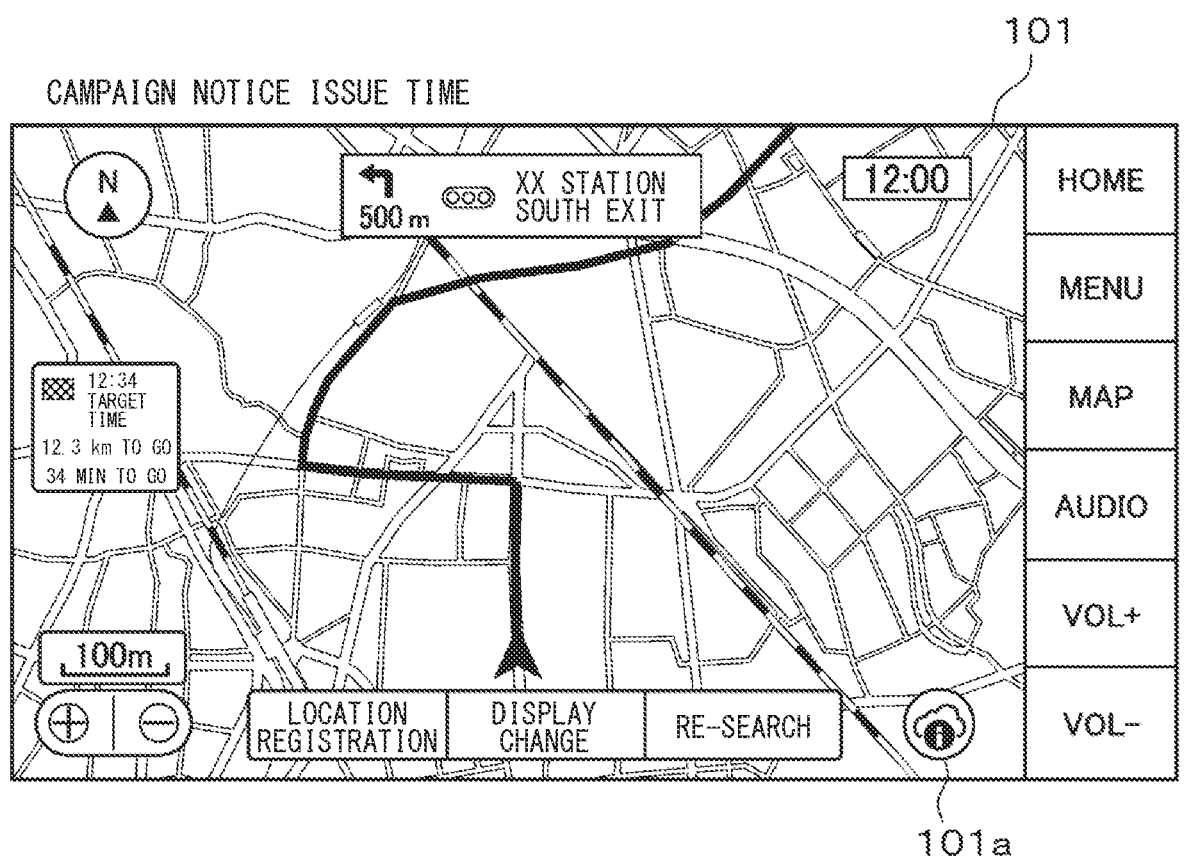
FIG. 4 is a diagram of a screen when a campaign notice is issued.

As shown in FIG. 3, the CGW 14 causes the in-vehicle display 7 to display, in a normal time before a campaign notice, a navigation screen 101 such as a well-known route guidance screen which is one of the navigation functions. When a campaign notice is issued from such a state, the CGW 14 displays a campaign notice icon 101a indicating an issuance of a campaign notice in a lower-right part of the navigation screen 101, as shown in FIG. 4. By recognizing/confirming the display of the campaign notice icon 101a, the user can recognize/understand that a campaign notice regarding the update of the application program has been issued.

Figure 5:
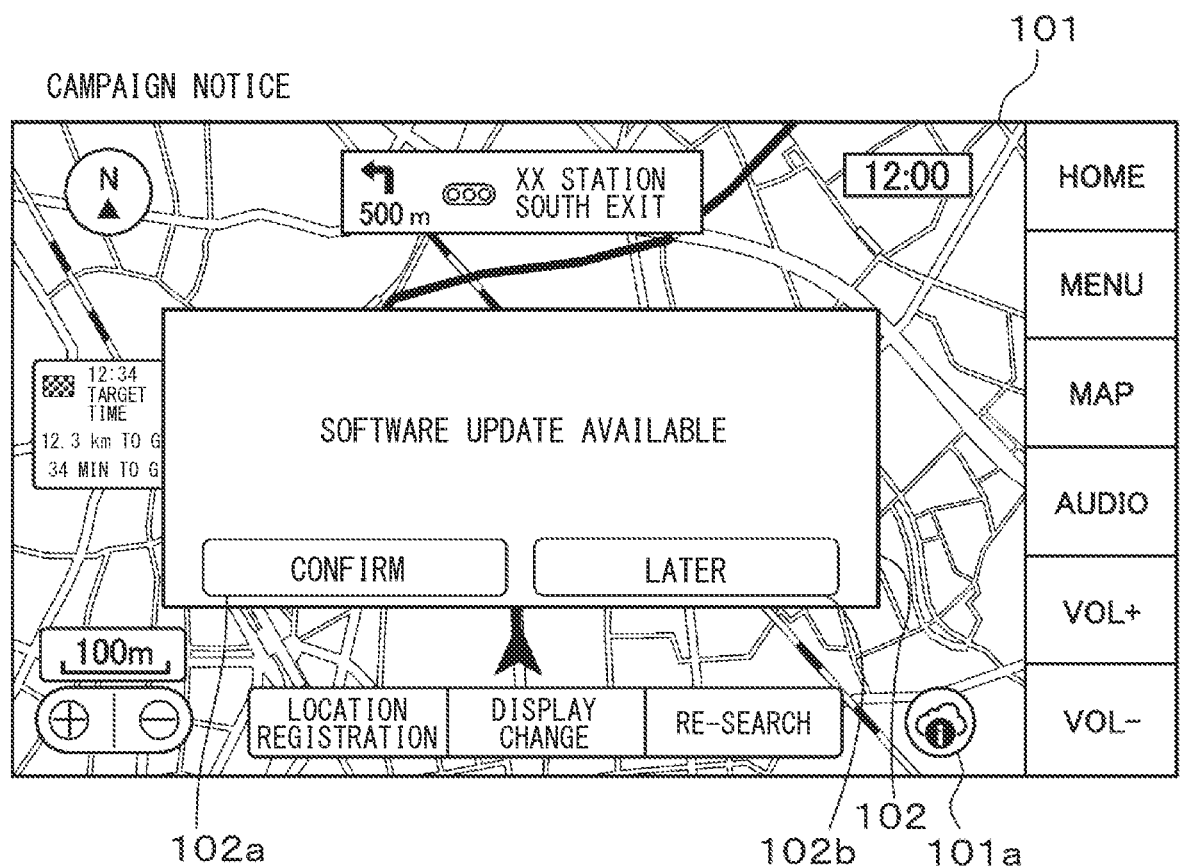
FIG. 5 is a diagram of a screen when a campaign notice is displayed.

When the user operates the campaign notice icon 101a in such a state, the CGW 14 pops up a campaign notice screen 102 on the navigation screen 101, as shown in FIG. 5. It should be noted that the CGW 14 is not limited to displaying the campaign notice screen 102 in a pop-up display, and other display modes may be adoptable. On the campaign notice screen 102, the CGW 14 notifies the user of the campaign notice by displaying, for example, a guidance "software update available" and also displays a "CONFIRM" button 102a and a "LATER" button 102b, and waits for user operation. In such a case, the user can proceed to the next screen for starting the rewriting of the application program by operating the "CONFIRM" button 102a. When the user operates the "LATER" button 102b, the CGW 14 erases the pop-up display of the campaign notice screen 102, and returns to the screen displaying the campaign notice icon 101a as shown in FIG. 4.

Figure 6:
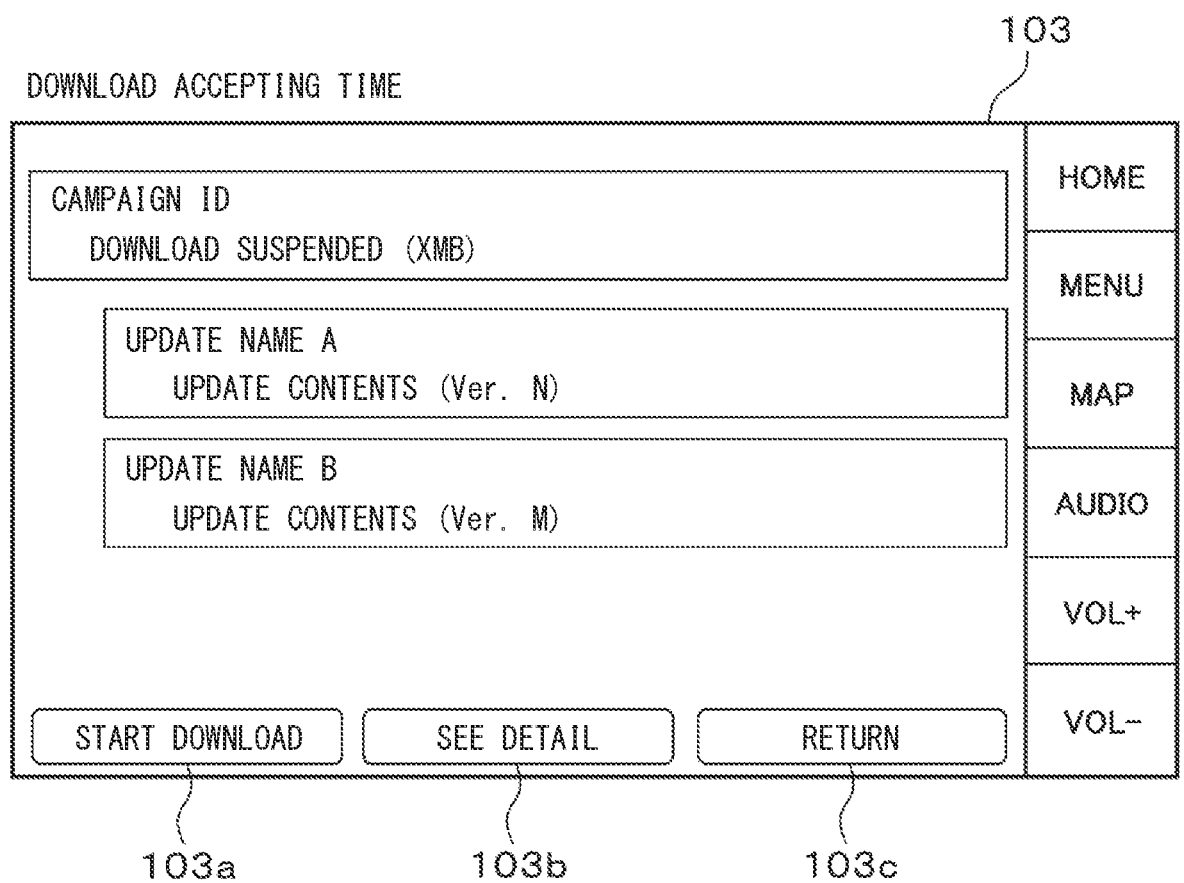
FIG. 6 is a diagram of a screen when a download is accepted.

When the user operates the "CONFIRM" button 102a in such a state, the CGW 14 switches the display from the navigation screen 101 to a download acceptance screen 103, and displays the download acceptance screen 103 on the in-vehicle display 7, as shown in FIG. 6. The CGW 14 informs the user of a campaign ID and an update name on the download acceptance screen 103, displays a "START DOWNLOAD" button 103a, a "SEE DETAIL" button 103b, and a "RETURN" button 103c, and waits for user operation. In such a case, the user can start the download by operating the "START DOWNLOAD" button 103a. That is, the user operating the "START DOWNLOAD" button 103a corresponds to the term "download acceptance operation" in the claims. Further, the user can display and confirm the details of the download by operating the "SEE DETAIL" button 103b, and can reject the download and return to the previous screen by operating the "RETURN" button 103c.

Figure 7:
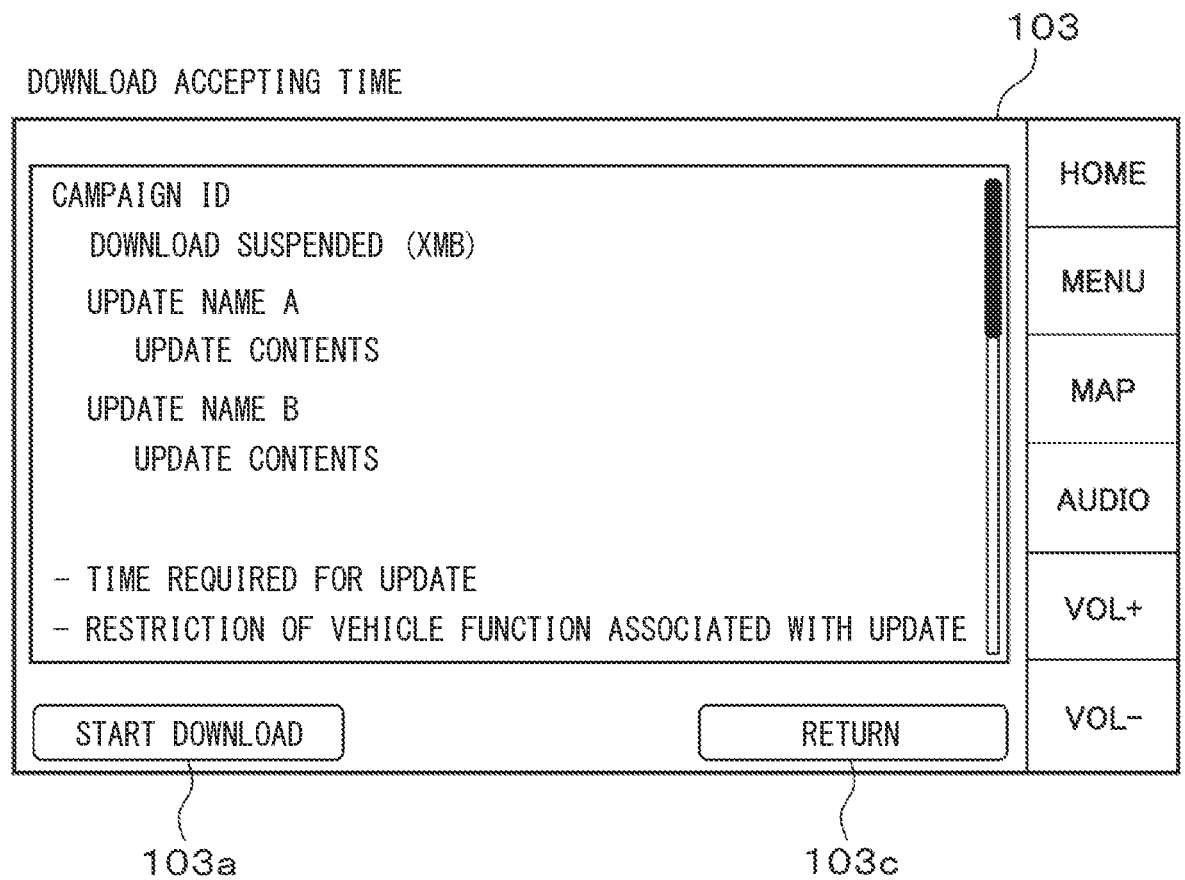
FIG. 7 is a diagram of another screen when a download is accepted.
Figure 8:
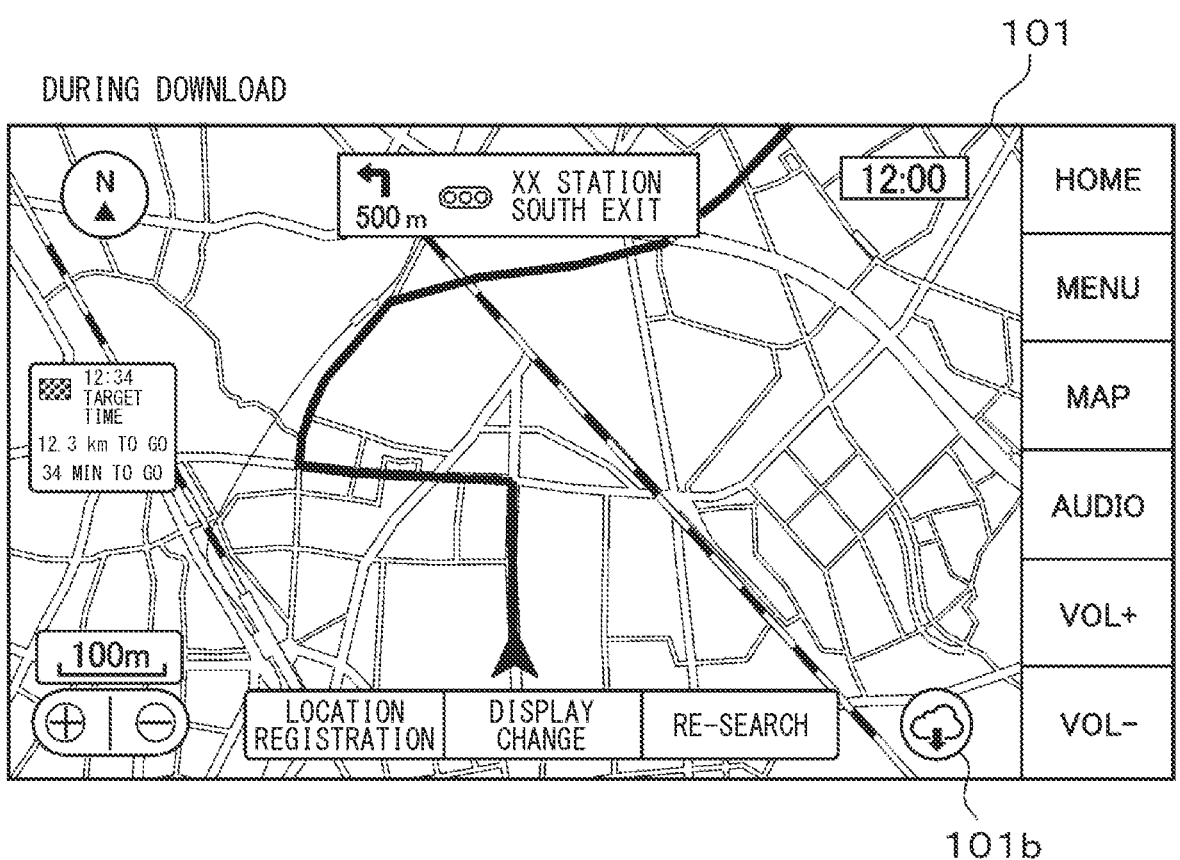
FIG. 8 is a diagram of a screen during a download.

When the user operates the "SEE DETAIL" button 103b in such a state, the CGW 14 switches the display content of the download acceptance screen 103, and displays the details of the download on the in-vehicle display 7, as shown in FIG. 7. The CGW 14 displays, according to the delivery specification data, update contents, time required for the update, restriction(s) of the vehicle function associated with the update, and the like as the details of the download. When the user operates the "START DOWNLOAD" button 103a, the CGW 14 starts downloading the delivery package from the center device 3. In parallel with starting the download of the delivery package, the CGW 14 switches the display from the download acceptance screen 103 to the navigation screen 101, causes the navigation screen 101 to be displayed again on the in-vehicle display 7 as shown in FIG. 8, and displays a download-in-progress icon 101b indicating that download is in progress in the lower right part of the screen 101. The user can confirm that the delivery package is being downloaded by confirming the display of the download-in-progress icon 101b.

Figure 9:
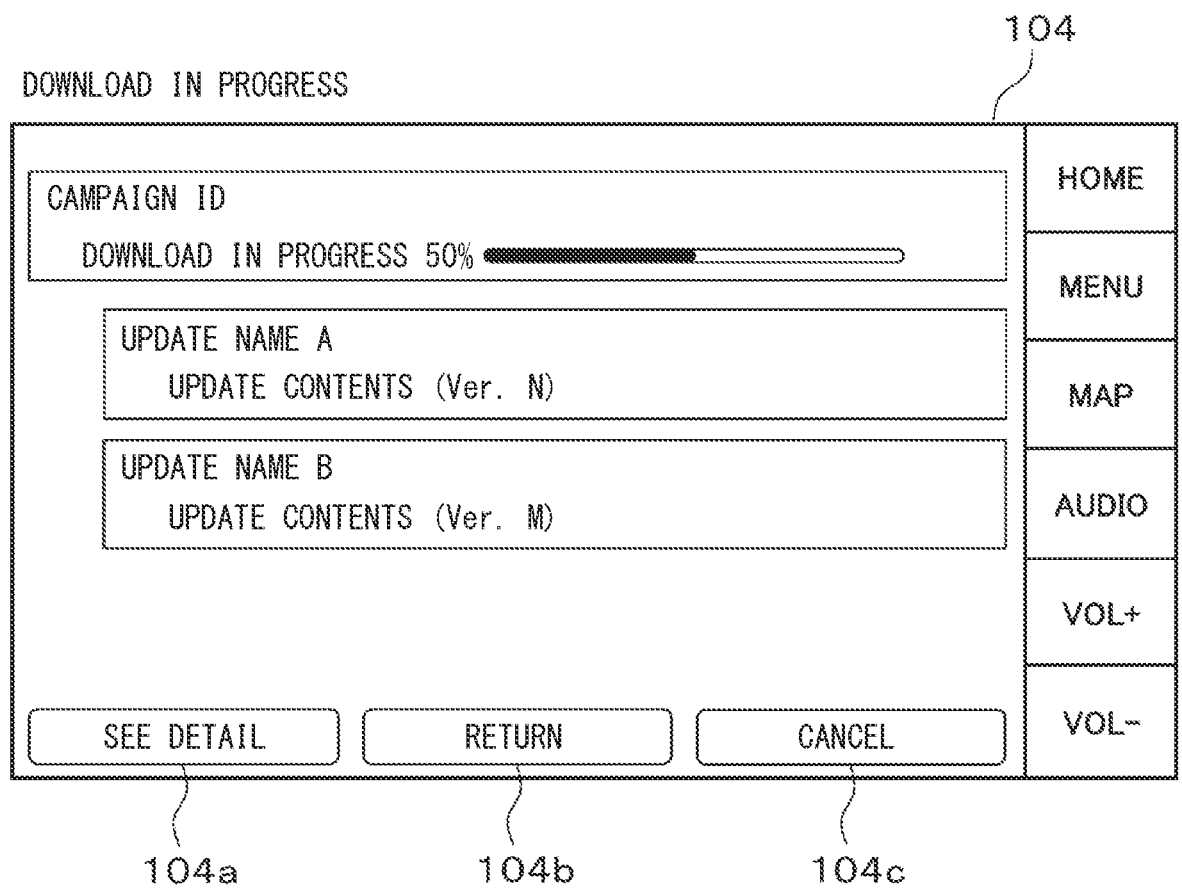
FIG. 9 is a diagram of another screen during a download.

When the user operates the download-in-progress icon 101b in such a state, the CGW 14 switches the display from the navigation screen 101 to a download-in-progress screen 104, and displays the download-in-progress screen 104 on the in-vehicle display 7, as shown in FIG. 9. On the download-in-progress screen 104, the CGW 14 notifies the user that the download is being executed, i.e., in progress, displays a "SEE DETAIL" button 104a, a "RETURN" button 104b, and a "CANCEL" button 104c, and waits for user operation. In such a case, the user can display the details of the download being executed by operating the "SEE DETAIL" button 104a, and/or can interrupt the download by operating the "CANCEL" button 104c.

Figure 10:
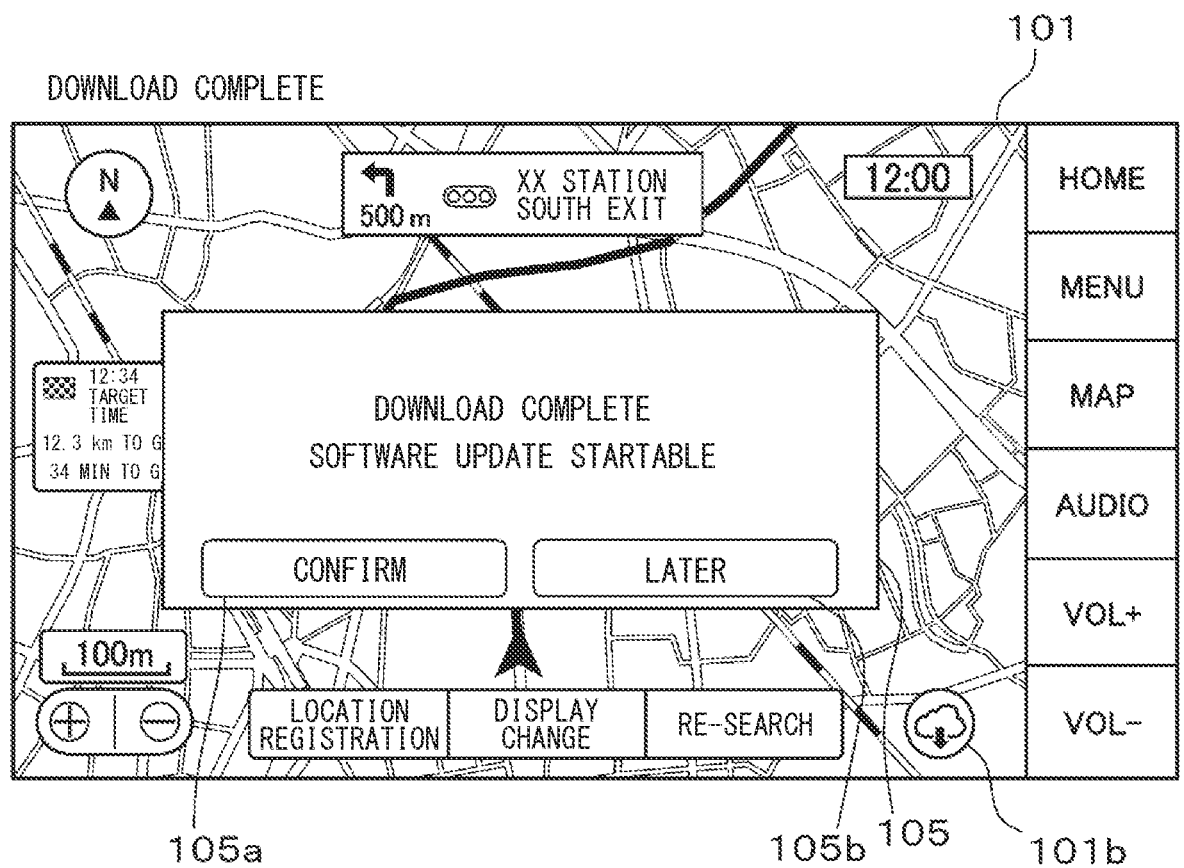
FIG. 10 is a diagram of a screen when a download is complete.

When the download of the delivery package is complete, the CGW 14 pops up a download complete notification screen 105 on the navigation screen 101 as shown in FIG. 10. On the download complete notification screen 105, the CGW 14 notifies the user of the completion of the download by displaying, for example, a guidance "DOWNLOAD IS COMPLETE, SOFTWARE UPDATE STARTABLE", and a "CONFIRM" button 105a and a "LATER" button 105b are displayed to wait for a user operation. In such a case, the user can proceed to the screen for starting the installation by operating the "CONFIRM" button 105a.

Figure 11:
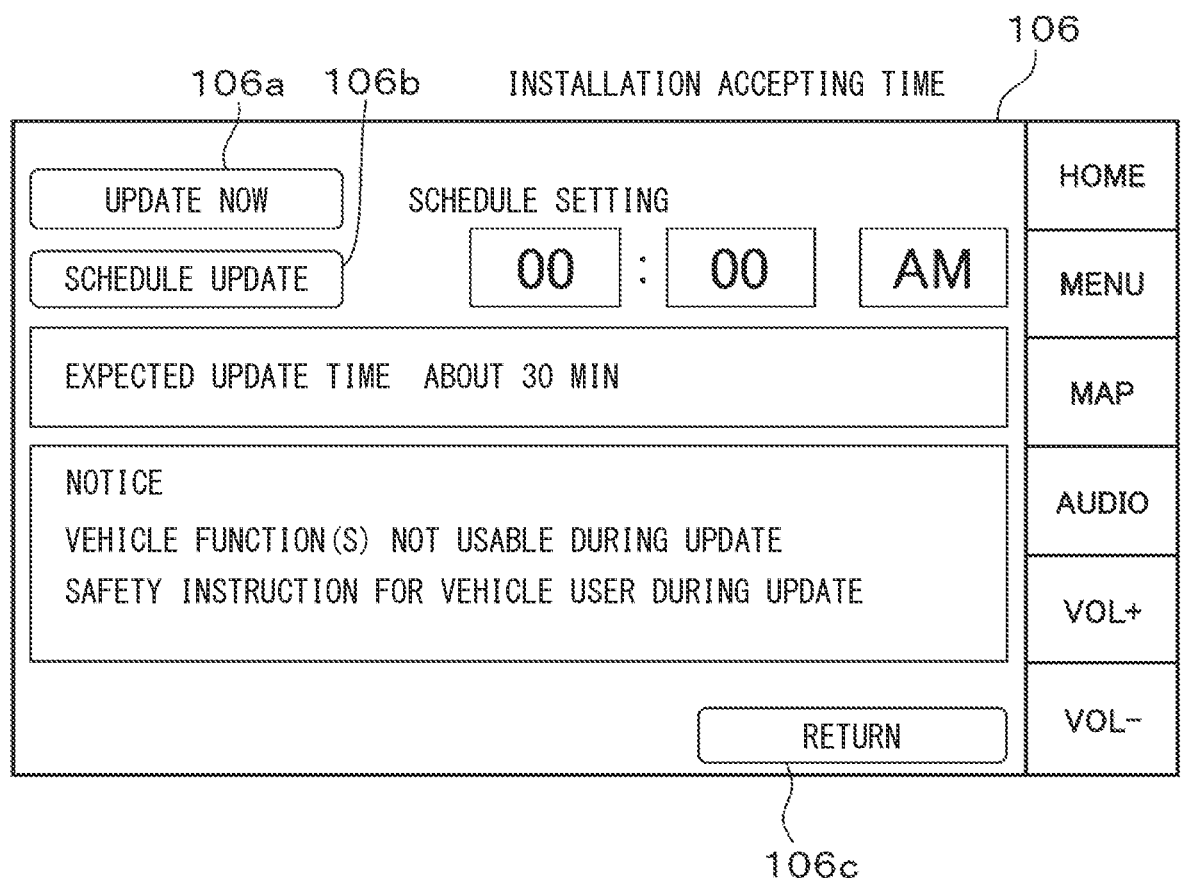
FIG. 11 is a diagram of a screen when an installation is confirmed.

When the user operates the "CONFIRM" button 105a in such a state, the CGW 14 switches the display from the navigation screen 101 to an installation acceptance screen 106, and displays the installation acceptance screen 106 on the in-vehicle display 7, as shown in FIG. 11. On the installation acceptance screen 106, the CGW 14 informs the user of time required for installation, restrictions regarding installation, and schedule settings thereof, and also displays an "UPDATE NOW" button 106a, a "SCHEDULE UPDATE" button 106b, and a "RETURN" button 106c, and waits for user operation. In such a case, the user can start the installation immediately by operating the "UPDATE NOW" button 106a, or can set time of the installation, i.e., can schedule desired time for the installation to be performed by operating the "SCHEDULE UPDATE" button 106b. That is, the user (i) operating the "UPDATE NOW" button 106a or (ii) setting the desired time of the installation and operating the "SCHEDULE UPDATE" button 106b corresponds to an installation acceptance operation ((in claims)). Also, the user can reject/cancel the installation and return to the previous screen by operating the "RETURN" button 106c.

Figure 12:
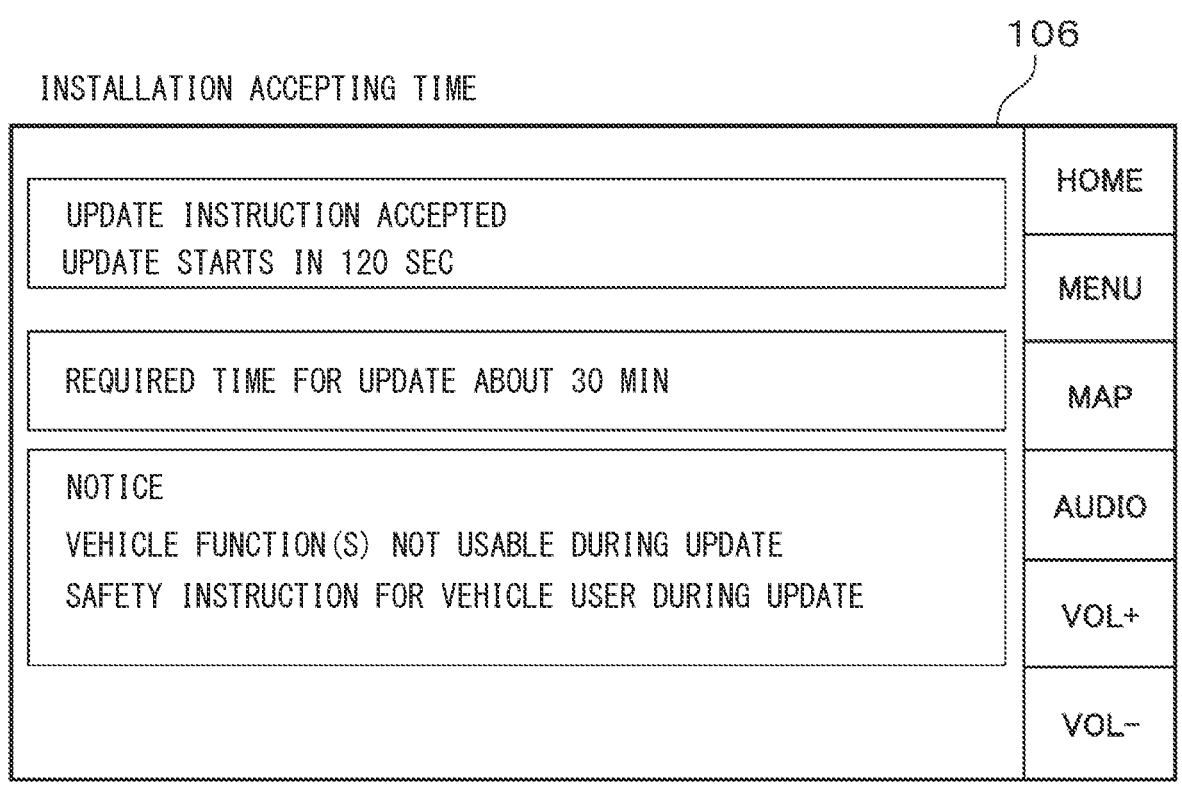
FIG. 12 is a diagram of another screen when an installation is confirmed.

When the user operates the "UPDATE NOW" button 106a in such a state, the CGW 14 switches the display content of the installation acceptance screen 106, and displays the details of the installation on the in-vehicle display 7, as shown in FIG. 12. The CGW 14 notifies the user, on the installation acceptance screen 106, that an installation request has been accepted and the installation is started.

Figure 13:
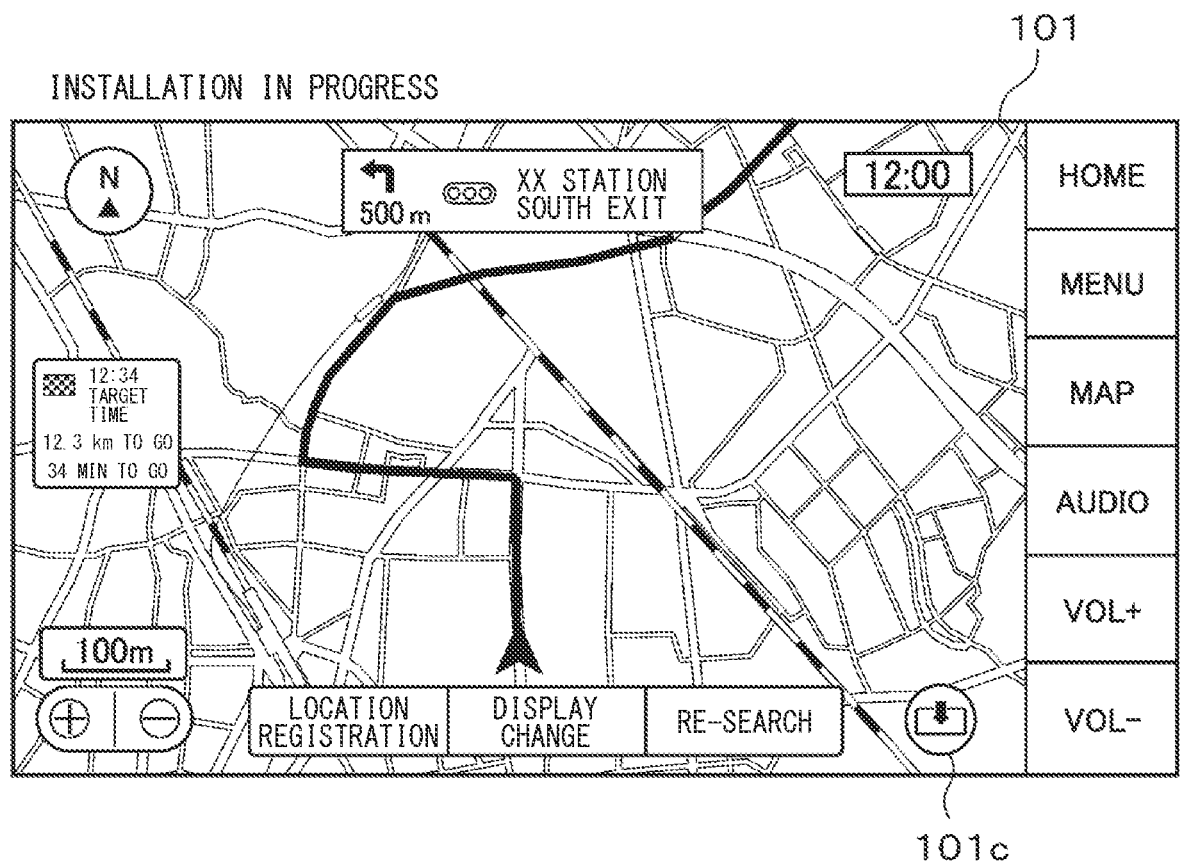
FIG. 13 is a diagram of a screen during an installation.

When the installation is started, the CGW 14 switches the display from the installation acceptance screen 106 to the navigation screen 101, causes the navigation screen 101 to be displayed again on the in-vehicle display 7 as shown in FIG. 13, and displays an install-in-progress icon 101c indicating that the installation is being executed in the lower right part of the navigation screen 101. The user can recognize that the installation is in progress by checking the display of the installation-in-progress icon 101c.

Figure 14:
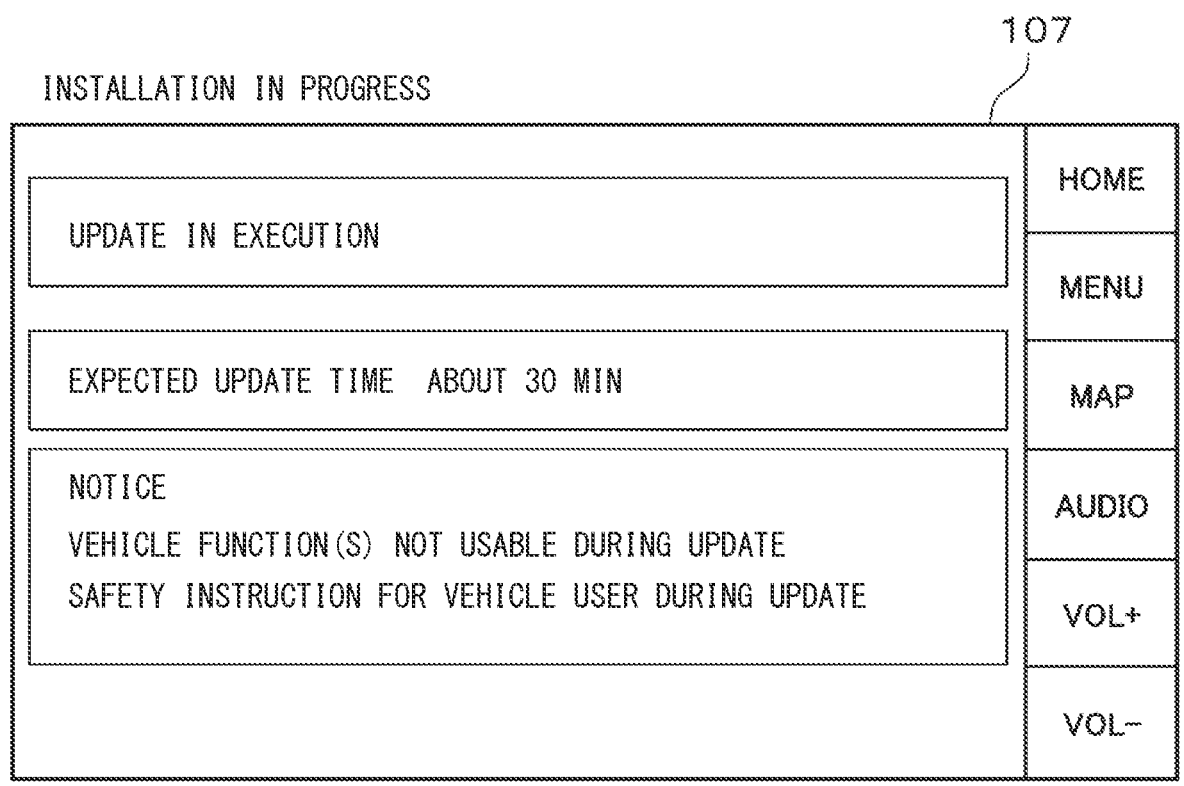
FIG. 14 is a diagram of another screen during an installation.

When the user operates the installation-in-progress icon 101c in such a state, the CGW 14 switches the display from the navigation screen 101 to an installation-in-progress screen 107, and displays the installation-in-progress screen 107 on the in-vehicle display 7, as shown in FIG. 14. The CGW 14 informs the user that the installation is in progress on the installation-in-progress screen 107. The CGW 14 may display, for example, a remaining time and a progress percentage as the progress of the installation on the installation in progress screen 107.

Figure 15:
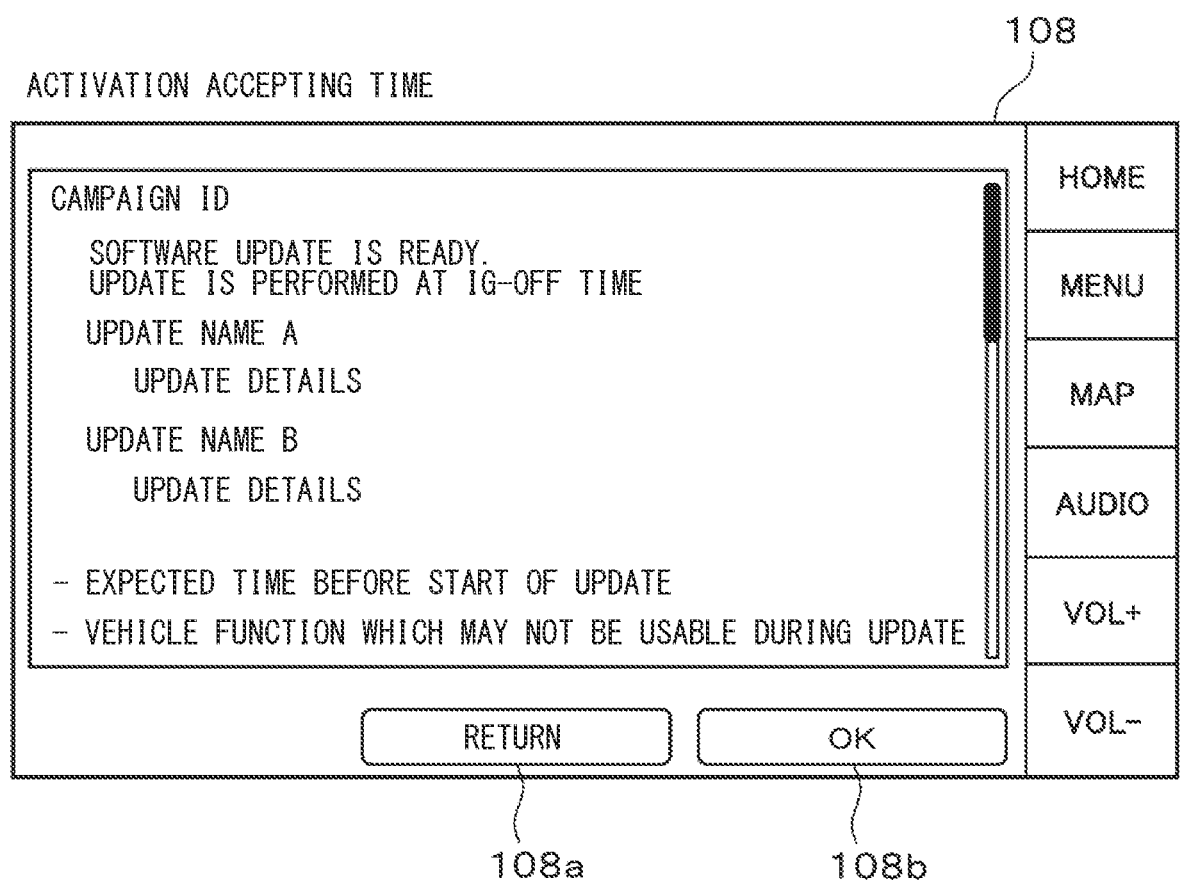
FIG. 15 is a diagram of a screen when activation is confirmed.

When the installation is complete, the CGW 14 switches the display from the navigation screen 101 to an activation acceptance screen 108, and displays the activation acceptance screen 108 on the in-vehicle display 7, as shown in FIG. 15. On the activation acceptance screen 108, the CGW 14 informs the user of the contents of the activation, displays a "RETURN" button 108a and an "OK" button 108b, and waits for user operation. In such a case, the user can reject/cancel the activation and return to the previous screen by operating the "RETURN" button 108a. Further, the user can accept the activation by operating the "OK" button 108b. That is, the user operating the "OK" button 108b corresponds to the term "an activation acceptance operation" in the claims.

Figure 16:
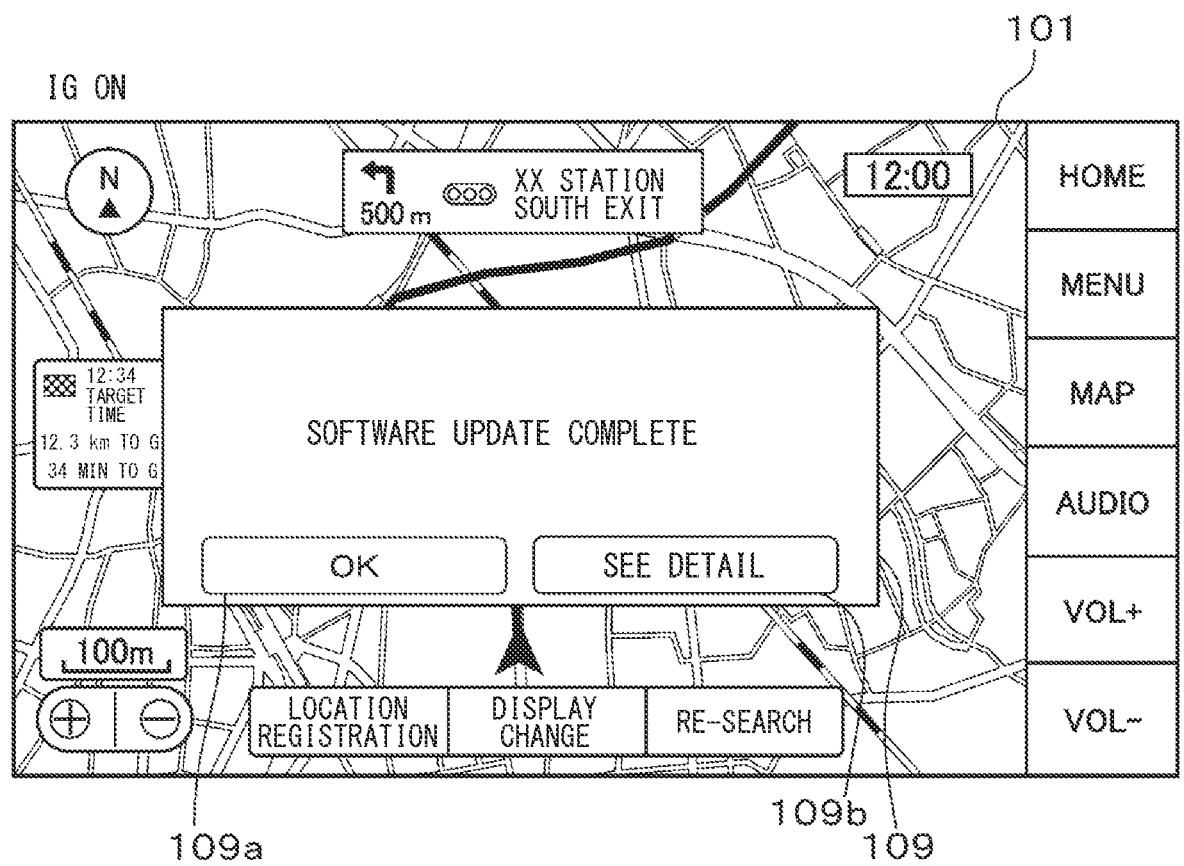

When the user operates the "OK" button 108b in such a state and then the user turns on an ignition (IG) power, the CGW 14 pops up an activation complete notification screen 109 on the navigation screen 101, as shown in FIG. 16. On the activation complete notification screen 109, the CGW 14 notifies the user of the completion of activation by displaying, for example, a guidance "SOFTWARE UPDATE IS COMPLETE," and also displays an "OK" button 109a and a "SEE DETAIL" button 109b, and waits for user operation. In such a case, the user can erase the popup display of the activation complete notification screen 109 by operating the "OK" button 109a, and can confirm/display the details of the completed activation by operating the "SEE DETAIL" button 109b.

Figure 17:
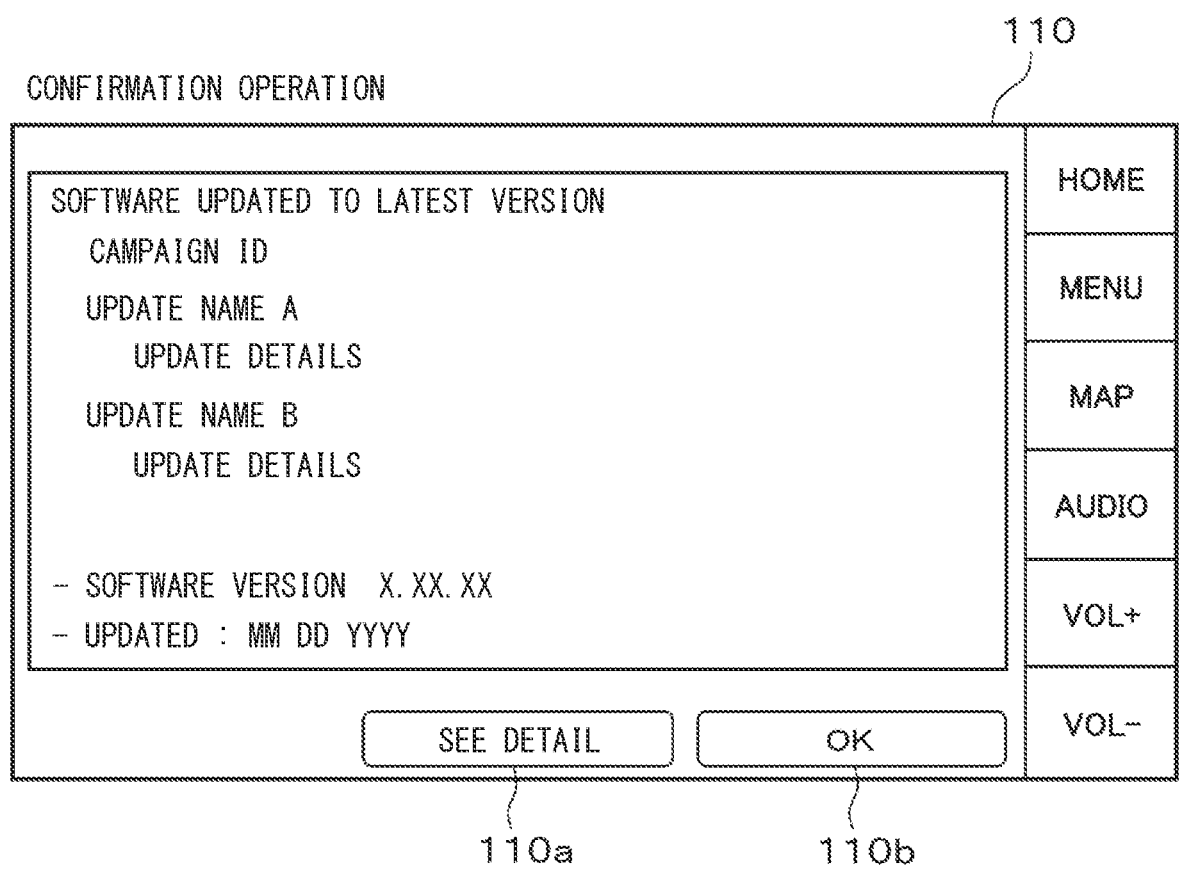
FIG. 17 is a diagram of a screen during confirmation operation.

When the user operates the "OK" button 109a in such a state, the CGW 14 switches the display from the navigation screen 101 to a confirmation operation screen 110, and displays the confirmation operation screen 110 on the in-vehicle display 7, as shown in FIG. 17. On the confirmation operation screen 110, the CGW 14 informs the user of the completion of activation, displays a "SEE DETAIL" button 110a and an "OK" button 110b, and waits for user operation. In such a case, the user can display the details of the completed activation by operating the "SEE DETAIL" button 110a.

Figure 18:
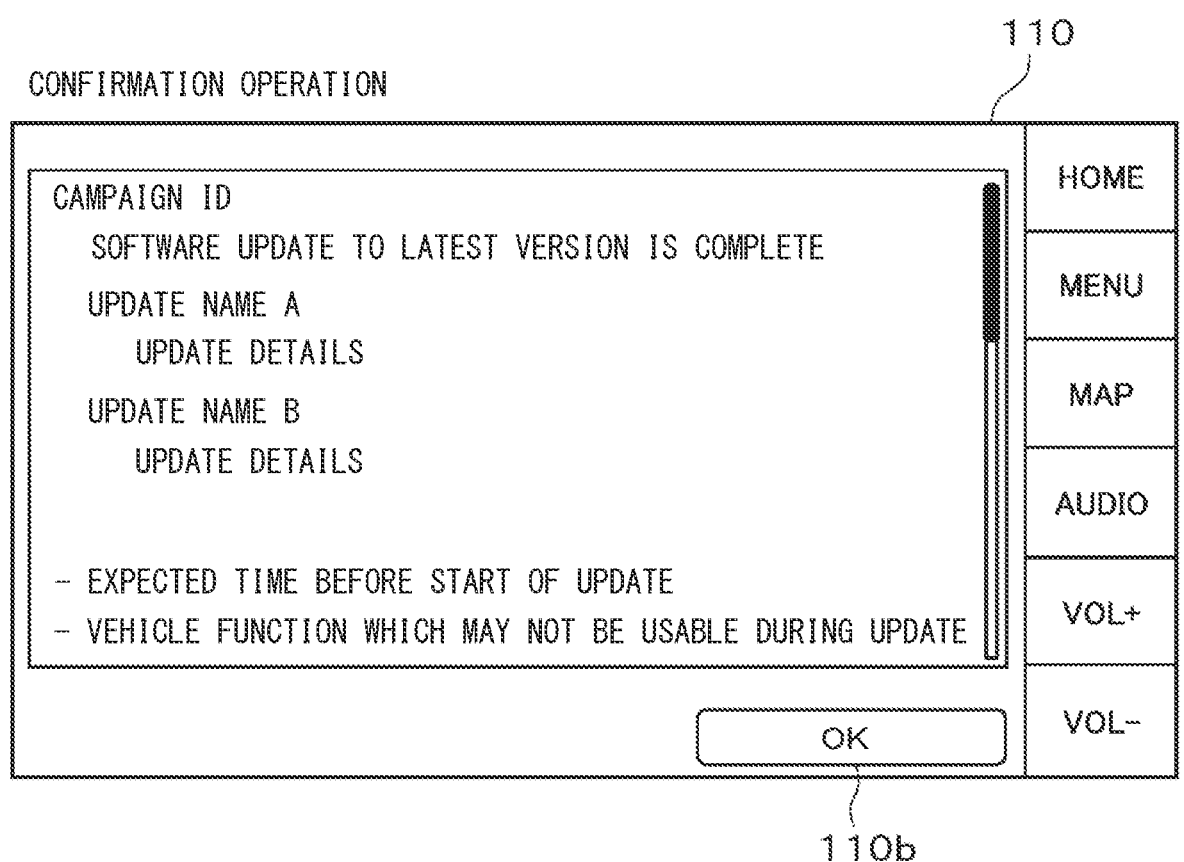
FIG. 18 is a diagram of another screen during confirmation operation.

When the user operates the "SEE DETAIL" button 110a in such a state, the CGW 14 switches the display content of the confirmation operation screen 110 as shown in FIG. 18, and displays changed/added functions by the program update and the like as the details of the completed activation on the in-vehicle display 7, together with the "OK" button 110b.

As described above, after the target vehicle of the program update is delivered from the yard to the user, basically, the user can shift/advance a certain phase to the next phase by performing the acceptance operation in the relevant phase (i.e., respective phases). That is, the CGW 14 advances the program update to the download phase when the user performs the download acceptance operation, and advances the program update to the installation phase when the user performs the installation acceptance operation, and advances the program update to the activation phase when the user performs the activation acceptance operation.

On the other hand, before the target vehicle of the program update is delivered from the yard to the user, it is desirable to proceed to a certain phase to the next phase even if the worker in charge of the yard work does not perform the acceptance operation in the respective phases. However, in a flow of work which is configured to proceed a certain phase to the next phase even when the acceptance operation is not performed in that phase, if the time from the start of the program update to the shipment is short, chances are that the program update is not yet complete to the end at the time of shipment. In this regard, the present embodiment adopts the following configuration.

Figure 19:
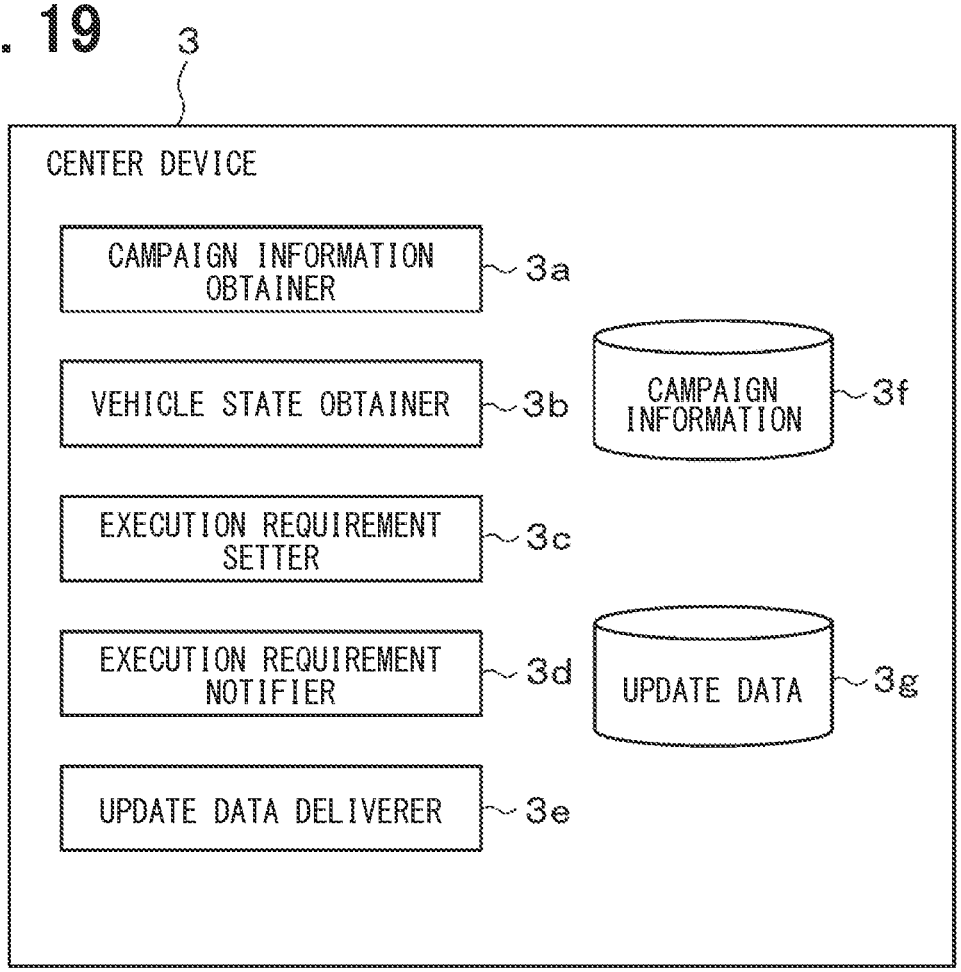
FIG. 19 is a functional block diagram of a center device.

As shown in FIG. 19, the center device 3 includes a campaign information obtainer 3a, a vehicle state obtainer 3b, an execution requirement setter 3c, an execution requirement notifier 3d, an update data deliverer 3e, a campaign information database (DB) 3f, and an update data database (DB) 3g. The campaign information obtainer 3a obtains program update campaign information upon having an operation input of the campaign information of the program update by a person in charge of the program update, and stores the obtained campaign information in the campaign information DB 3f. Note that the campaign information obtainer 3a may obtain the campaign information from an external server without being limited to the operation input of the campaign information of the program update by the person in charge of the program update. The campaign information includes items such as a campaign period, required campaign execution time, a target vehicle of the program update, a phase acceptance required-or-not setting, and a back-end cooperation required-or-not setting. In the present embodiment, the back-end cooperation required-or-not setting is a setting of whether or not to request the OEM server 11 for the delivery plan of the target vehicle managed by the OEM server 11 described later. That is, when the back-end cooperation is required, a request for the delivery plan of the target vehicle is sent to the OEM server 11, and when the back-end cooperation is not required, the delivery plan of the target vehicle is not requested to the OEM server 11. The vehicle state obtainer 3b obtains the delivery plan of the target vehicle as a vehicle state of the target vehicle of the program update when the back-end cooperation is required.

When the campaign information is obtained by the campaign information obtainer 3a and the vehicle state is obtained by the vehicle information obtainer 3b, the execution requirement setter 3c sets the execution requirements of the phase of the program update based on the campaign information and vehicle condition obtained as described above. Specifically, the execution requirement setter 3c determines whether it is necessary to change the setting of whether the acceptance of the phase is required (to proceed a phase to the next one), and, when it is determined that the setting of the acceptance of the phase needs to be changed, the execution requirement setter 3c changes the setting of whether the acceptance of the phase is required, and sets the execution requirements. When setting of whether the acceptance of the phase is required is changed to acceptance is required to advance a phase, the execution requirement setter 3c sets (i.e., changes) the execution requirements such that (i) an accepted phase is executable and (ii) a non-accepted phase is non-executable. On the other hand, when it is determined that the setting of the acceptance of the phase needs not be changed, the execution requirement setter 3c sets the execution requirement without changing the setting of whether the acceptance of the phase is required (to proceed a phase to the next one). The execution requirement setter 3c sets whether or not the acceptance is required or not for the download phase, whether or not the acceptance is required for the installation phase, and whether or not the acceptance is required for the activation phase, and sets execution requirements for each of those phases.

When the execution requirements are set by the execution requirement setter 3c, the execution requirement notifier 3d notifies the master device 12 of the set execution requirements. Specifically, when it is determined that there is no need to change the setting of whether the acceptance of the phase is required, the execution requirement notifier 3d notifies the master device 12 of the execution requirements by delivering the campaign information, and, when it is determined that it is necessary to change the setting of whether the acceptance of the phase is required, the execution requirement notifier 3d notifies the master device 12 of the execution requirements by delivering the campaign information and by instructing the change of the setting of whether the acceptance of the phase is required.

When it is determined by the execution requirement determiner 3c that change of the setting of whether the acceptance is required is required, the update data deliverer 3e instructs the master device 12 of the target vehicle of the program update to (i) change of setting of whether the acceptance of the phase is required and (ii) perform the update of the program, and delivers the update data stored in the update data DB 3g to the master device 12 of the target vehicle. When it is determined by the execution requirement determiner 3c that change of the setting of whether the acceptance is required is NOT required, the update data deliverer 3e instructs the master device 12 of the target vehicle of the program update (i) NOT TO change the setting of whether the acceptance of the phase is required and (ii) perform the update of the program, and delivers the update data stored in the update data DB 3g to the master device 12 of the target vehicle.

Figure 20:
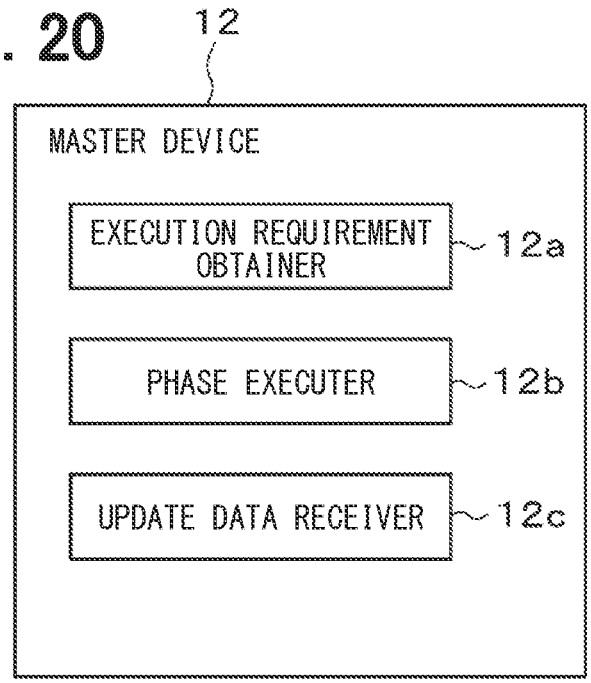
FIG. 20 is a functional block diagram of a master device.

As illustrated in FIG. 20, the master device 12 includes an execution requirement obtainer 12a, a phase executer 12b, and an update data receiver 12c. The execution requirement obtainer 12a obtains the execution requirements from the center device 3. When the execution requirements are obtained by the execution requirement obtainer 12a, the phase executer 12b executes the phase in the program update based on the obtained execution requirements. The update data receiver 12c receives the update data from the center device 3.

The OEM server 11 manages a delivery plan table regarding a delivery plan of vehicles from the yard, as shown in FIG. 21. In an example of FIG. 21, vehicles corresponding to vehicle IDs "1001" to "1100" are scheduled to be delivered from 9:00 to 12:00 on September 1. The vehicle ID may be classified arbitrarily by any item such as vehicle type, grade, model, manufacturing date, and the like, and delivery time zones may also be arbitrarily defined.

Figure 22:
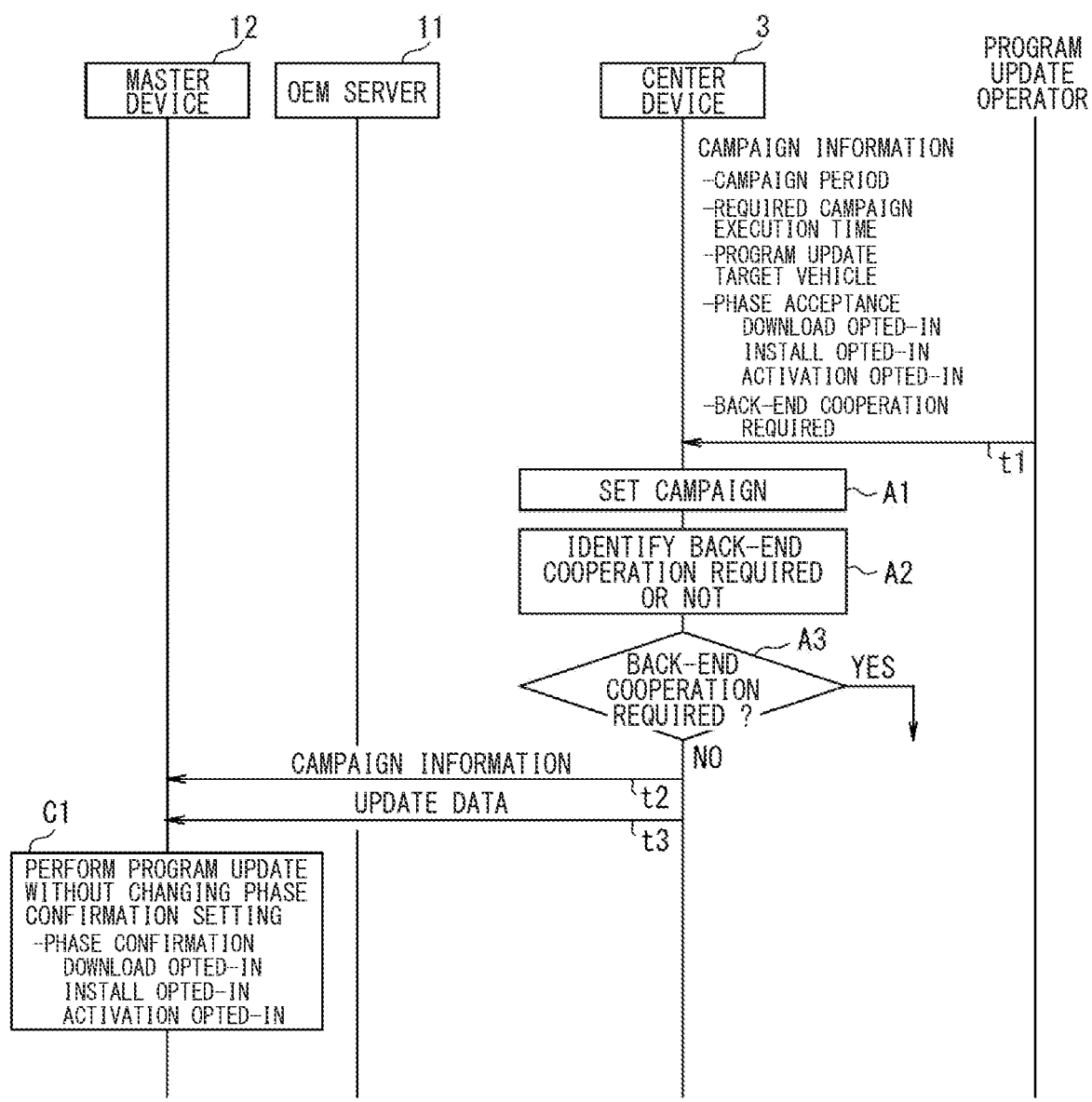
FIG. 22 is a diagram of a flow of processing.
Figure 23:
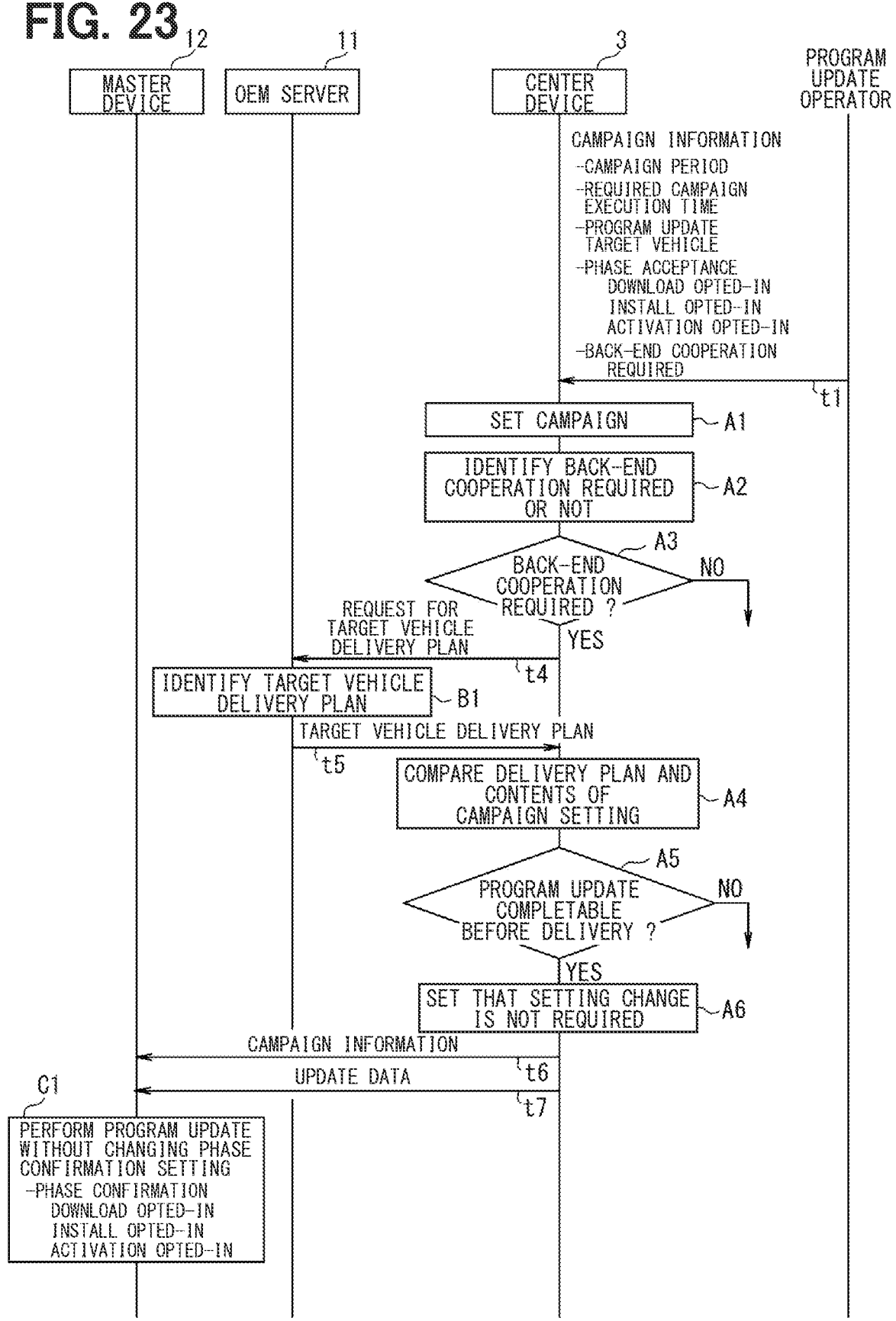
FIG. 23 is a diagram of another flow of processing.
Figure 24:
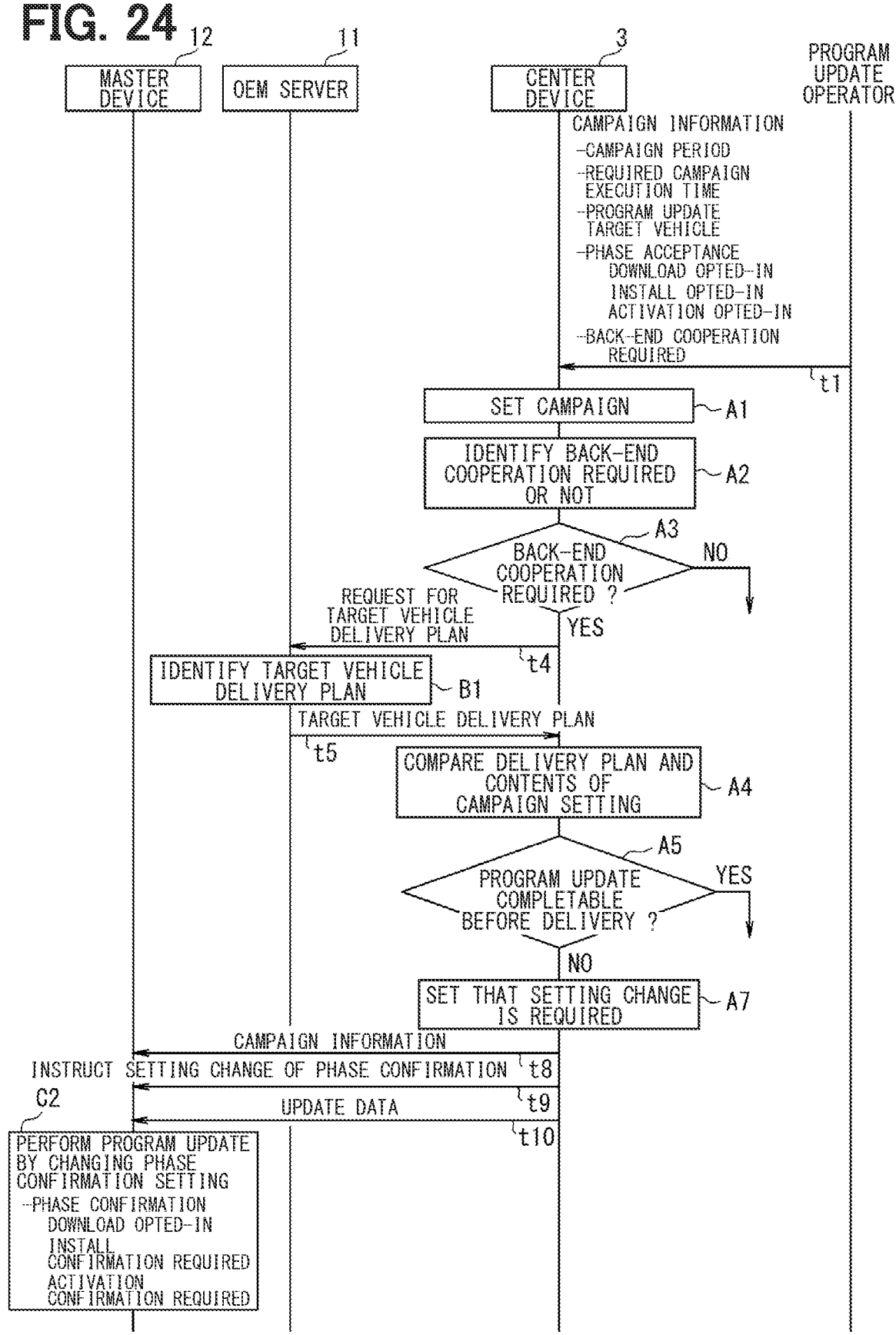
FIG. 24 is a diagram of yet another flow of processing.

Next, operational effects of the above configuration are described with reference to FIGS. 22 to 24. When a person in charge of the program update obtains the program update campaign information by performing the operation input of the program update campaign information (t1, which corresponds to a campaign information obtaining procedure), the center device 3 stores the obtained campaign information, and sets up a campaign (A1). That is, the center device 3 sets items such as a campaign period, a required campaign execution time, a target vehicle of the program update, a phase acceptance required or not, and a back-end cooperation required or not. In an example of FIG. 22, the center device 3 sets a download acceptance not required (OPTED-IN), an installation acceptance not required (OPTED-IN), and an activation acceptance not required (OPTED-IN) as the phase acceptance setting, and sets a back-end cooperation required as the back-end cooperation required or not setting. The campaign period is a period of campaign during which the program can be updatable, that is, the program can be updated within such campaign period, and the program can be no longer updated after expiration of the campaign period. The required campaign execution time is a time/duration from the start to the completion of the program update, including a download time of the delivery package from the center device 3 and a write time of the write data. Further, the download time of the delivery package includes time to verify normality of the delivery package, and the write time of the write data includes time to verify normality of the delivery package, time to verify normality of the rewrite target ECU, and the like.

When a campaign is set, the center device 3 identifies the back-end cooperation included in the campaign information is required (A2), and determines whether the back-end cooperation is required (A3).

When the center device 3 identifies that the back-end cooperation is set as not required, i.e., determining that no back-end cooperation is required (A3: NO), as shown in FIG. 22, the center device 3 delivers the campaign information to the master device 12 of the target vehicle (t2), and delivers the update data to the master device 12 of the target vehicle (t3).

When the master device 12 of the target vehicle subject to the program update receives the campaign information and the update data from the center device 3, thereafter, the master device 12 performs the program update without changing the setting of acceptance of the phase (C1). That is, when the center device 3 sets the download acceptance not required, the installation acceptance not required, and the activation acceptance not required as the acceptance requirement of the phase based on the campaign information, the master device 12 does not require the download acceptance, the installation acceptance, and the activation acceptance for performing the program update.

On the other hand, when the center device 3 determines that the back-end cooperation requirement is set as required (A3: YES), as shown in FIGS. 23 and 24, the center device 3 requests the OEM server 11 for the delivery plan of the target vehicle (t4). When the OEM server 11 receives a request for the delivery plan of the target vehicle, the OEM server 11 identifies a delivery plan of the target vehicle from the delivery plan database (B1), and transmits the identified delivery plan of the target vehicle to the center device 3 (T5).

Upon receiving the delivery plan of the target vehicle from the OEM server 11 (corresponding to a vehicle state obtaining procedure), the center device 3 compares the received delivery plan with the campaign period and the required execution time included in the campaign information (A4), and determines whether or not the program update of the target vehicle is completable before delivery from the yard (A5).

When the center device 3 determines that the program update of the target vehicle is completable before delivery from the yard (A5: YES), the center device 3 sets that setting change of the phase acceptance requirement is not required (A6, which corresponds to an execution requirement setting procedure), delivers the campaign information to the master device 12 of the target vehicle (t6, which corresponds to an execution requirement notification procedure), and delivers the updated data to the master device 12 of the target vehicle (t7), as shown in FIG. 23. In an example of FIG. 21, assuming that (i) the target vehicle of the program update has a vehicle ID "1111," (ii) the program update start time is set to 9:00 on September 1, (iii) September 1 is within the campaign period, and (iv) the required campaign execution time is "1 hour," the program update is complete by 12:00 of the scheduled delivery time. Therefore, the center device 3 determines that update of the program of the target vehicle is completable before the delivery from the yard.

When the master device 12 of the target vehicle of the program update has received (i) the campaign information from the center device 3 (corresponds to an execution requirement obtaining procedure) and (ii) the update data from the center device 3 (corresponds to an update data reception procedure), the master device 12 thereafter performs the program updated without changing the setting of phase acceptance (C1, which corresponds to a phase execution procedure). That is, when the center device 3 sets the download acceptance not required, the installation acceptance not required, and the activation acceptance not required as the acceptance requirement of the phase based on the campaign information, the master device 12 does not require the download acceptance, the installation acceptance, and the activation acceptance for performing the program update. That is, without having any operation input by the person in charge of the yard work regarding the acceptance of the download/installation/activation, the process is complete up to the activation phase.

On the other hand, when the center device 3 determines that the program update of the target vehicle cannot be complete before the delivery from the yard (A5: NO), as shown in FIG. 24, the center device 3 sets that setting change of the phase acceptance requirement is required (A7, which corresponds to an execution requirement setting procedure), delivers the campaign information to the master device 12 of the target vehicle (8), and instructs the master device 12 of the target vehicle to change the setting of whether or not to accept the phase (t9, which corresponds to an execution requirement notification procedure), and delivers the update data to the master device 12 of the target vehicle (t10, corresponding to an update data delivery procedure). In an example of FIG. 21, assuming that (i) the target vehicle of the program update has a vehicle ID "1211," (ii) the program update start time is set to 14:00 on September 1, (iii) September 1 is within the campaign period, and (iv) the required campaign execution time is "1.5 hours," the program update is not complete by the scheduled delivery time of 15:00. Therefore, the center device 3 determines that update of the program of the target vehicle cannot be complete before delivery from the yard.

When the master device 12 of the target vehicle which is a subject of the program update receives the campaign information from the center device 3, is instructed by the center device 3 to change the setting of whether or not to accept the phase (corresponding to an execution requirement obtaining procedure), and receives the update data from the center device 3 (corresponding to an update data reception procedure), the master device 12 thereafter performs the program update by changing the setting of the phase acceptance requirement (C2, which corresponds to a phase execution procedure). That is, when the center device 3 sets download acceptance not required, installation acceptance not required, and activation acceptance not required as the phase acceptance requirement based on the campaign information, the master device 12 changes (i) the phase acceptance required or not setting for the installation from "not required" to "required," and (ii) the phase acceptance required or not setting for the activation from "not required" to "required," and performs the program update based on the setting (a) download acceptance not required, (b) installation acceptance required, and (c) activation acceptance required. In other words, even without having any operation input of the worker in charge of the yard work regarding download acceptance, the process is complete up to the download phase. However, the phases after download will not be complete without acceptance operation. That is, the installation phase cannot be complete without performing the installation acceptance operation, and the activation phase cannot be complete without performing the activation acceptance operation.

It should be noted that, although an example of the master device 12, i.e., changing the installation phase from "acceptance not required" to "acceptance required," and changing the activation phase from "acceptance not required" to "acceptance required" is shown in the above, the changing of "acceptance" requirement may be determined phase to phase according to or based on the required execution time of respective phases. In other words, by dividing the required campaign execution time into the download phase execution time, the installation phase execution time, and the activation phase execution time, the phase of needing "acceptance" requirement change may then be determined. For example, if the installation phase is going to be complete by the scheduled delivery time, the acceptance requirement of the installation phase may be left unchanged as "acceptance not required," and only the activation phase may be changed from "acceptance not required" to "acceptance required."

Further, if a target ECU of the program update is equipped only with a two-phase memory, without changing the acceptance requirement of the install phase from "acceptance not required" to "acceptance required," acceptance requirement of the activation phase may only be changed "acceptance not required" to "acceptance required." If the target ECU of the program update includes a one-phase memory, it may be possible to change acceptance requirement of the installation phase only, from "acceptance not required" to "acceptance required," without changing acceptance requirement of the activation phase, from "acceptance not required" to "acceptance required." The two-phase memory mentioned here is a memory having a flash phase substantially as two separate phases, and is a memory having a concept of an operation phase and a non-operation phase. The two-phase memory can rewrite a non-operation phase application program while an operation phase application program is being executed, and has a structure in which the flash phase is provided as completely-separated two phases, which enables rewriting of the application program at an arbitrary timing, e.g., during a travel of the vehicle or the like. The one-phase memory includes (i) a one-phase only memory in which (a) a flash phase is one phase only and (b) no such concept of an operation phase and a non-operation phase is provided, and (ii) a one-phase suspend memory in which (a) a flash phase is provided as pseudo two phases and (b) a concept of an operation phase and a non-operation phase is adopted. The one-phase only memory cannot (i.e., does not allow) rewriting of the application program during execution of an application program. The one-phase suspend memory can rewrite the non-operation phase application program while the operation phase application program is being executed, but it still has a restriction on the timing when reading and writing can be done normally, and the application program cannot be rewritten while the vehicle is running. That is, the application program can be rewritten during parking time, i.e., while the IG power of the vehicle is turned OFF.

As described above, an example is described as a configuration in which, when the center device 3 instructs the master device 12 of the target vehicle to change the setting of the acceptance of a phase or phases, the master device 12 changes the setting of the acceptance of the relevant phase(s) and for the program update. However, the center device 3 may change the setting of the acceptance of the phase(s) and the acceptance setting changed campaign information may be delivered to the master device 12. That is, the master device 12 or the center device 3 may both change the setting of acceptance of the phase(s).

Also, in the above, an example of (i) setting the execution requirement for the phases in the program update and (ii) changing the setting of the acceptance or non-acceptance of the relevant phase(s) has been described. However, for example, when the vehicle is in a travelable state by the turning on of the IG switch, the predetermined phase(s) may be set as executable, based on the setting of the execution requirements. That is, if the target ECU of the program update has the two-phase memory only, the installation phase may set to be executable when the vehicle is travelable by/due to the turning ON of the IG switch. Further, the execution requirement may be set such that a predetermined phase is executable when the vehicle is in a non-travelable state due to the turning OFF of the IG switch. That is, if the target ECU of the program update includes the one-phase memory, the installation phase may be made executable when the vehicle is in a non-travelable state due to the turning OFF of the IG switch.

Further, the execution requirement may be set so that a predetermined phase is unconditionally executed, or the execution requirement may be set so that execution of a predetermined phase is unconditionally avoided/prohibited (i.e., a predetermined phase is unconditionally non-executable).

As described above, according to the present embodiment, the following operational effects are achievable. In the center device 3, the delivery plan of the target vehicle of the program updated is obtained, and whether or not it is necessary to change the setting of acceptance requirement of the phase is determined according to the obtained delivery plan, and, when it is determined that the change of the setting of acceptance requirement of the phase is necessary, the target vehicle of the program update is instructed to perform the program update by changing the setting of acceptance requirement of the phase. If the target vehicle of the program update cannot complete the program update before, for example, delivery of the vehicle, by changing the setting of the original campaign information, which changes the acceptance requirement of the phase from "acceptance not required" to "acceptance required," the phases of the program update are made complete up to the phase that requires acceptance. Therefore, by avoiding the possibility that the program update ends in an abnormal completion (i.e., ends in an incomplete state), the program update is appropriately performable.

When the center device 3 determines that it is not necessary to change the setting of the acceptance requirement of the phase, the target vehicle of the program update is instructed to execute the program update without changing the setting of the acceptance requirement of the phase. That is, when the target vehicle of the program update can complete the program update to the end, by not changing the setting of the original campaign information and not changing the acceptance requirement of the phase, the program update according to the original campaign information is properly performable.

While the present disclosure has been described based on the embodiment, the present disclosure is not limited to the embodiment or structure described herein. The present disclosure encompasses various modifications and variations within the scope of equivalents. Further, various combinations and configurations as well as other combinations and configurations including an additional element added thereto or subtracting an element dropped therefrom are within the scope and spirit of the present disclosure.

The center device 3 may be provided with the function of the OEM server 11, or the center device 3 may manage a delivery plan table indicating a delivery plan of vehicles from the yard.

Although a configuration in which the OEM server 11 collectively manages the delivery plan for each vehicle has been illustrated, a modification of the configuration is possible in which, when (i) the vehicles individually manage the delivery plan and (ii) it is determined that the back-end cooperation is set as required in the center device 3, the delivery plan may be requested to the master device 12 of the target vehicle. Further, the master device 12 is not limited to transmitting the delivery plan to the center device 3 after the delivery plan is requested from the center device 3, but, once the delivery plan is determined/fixed, the master device 12 may transmit the delivery plan to the center device 3 without receiving a request from the center device 3.

The control scheme and method described in the present disclosure may be implemented by a special purpose computer which is configured with a memory and a processor programmed to perform one or more functions embodied in computer programs stored in the memory. Alternatively, the control scheme and method thereof described in the present disclosure may be implemented by a special purpose computer configured as a processor with one or more dedicated hardware logic circuits. Alternatively, the control scheme and method described in the present disclosure may be implemented by one or more dedicated, special purpose computers, which are configured as a combination of (i) a memory and a processor programmed to perform one or more functions and (ii) a processor with one or more hardware logic circuits. The computer program may also be stored on a computer readable non-transitory, tangible recording medium as instructions to be executed by a computer.

What is claimed is:

1. A center device for delivering update data about a program update to a vehicle master device comprising:
    a campaign information obtainer obtaining campaign information of the program update;
    a vehicle state obtainer obtaining a vehicle state of a target vehicle of the program update;
    an execution requirement setter setting an execution requirement of a phase in the program update based on the campaign information obtained by the campaign information obtainer and based on the vehicle state obtained by the vehicle information obtainer;
    an execution requirement notifier notifying the vehicle master device of the execution requirement set by the execution requirement setter; and
    an update data deliverer distributing the update data to the vehicle master device;
    wherein the execution requirement setter determines whether there is a necessity to change a setting of a user acceptance requirement of the phase, and, when it is determined that there is the necessity to change the setting of the user acceptance requirement of the phase, the execution requirement setter changes the setting of the user acceptance requirement of the phase and sets the execution requirement; and
    wherein the user acceptance requirement indicates one of
        (a) that user acceptance is not required and a present phase can proceed to a next phase without receiving input indicating an acceptance operation of the user, or
        (b) that user acceptance is required and the present phase cannot proceed to the next phase unless input indicating the acceptance operation of the user is received.

2. The center device according to claim 1, wherein
    when the acceptance requirement of the phase is set to indicate that acceptance is required, the execution requirement setter sets the execution requirement such that (i) an accepted phase is executable and (ii) a non-accepted phase is non-executable.

3. The center device according to claim 1, wherein when it is determined that there is not the necessity to change the setting of the user acceptance requirement of the phase, the execution requirement setter sets the execution requirement without changing the setting of the user acceptance requirement of the phase.

4. The center device according to claim 1, wherein
the vehicle state obtainer obtains a delivery plan from a predetermined place regarding the target vehicle of the program update as the vehicle state of the target vehicle of the program update, and
the execution requirement setter determines whether there is the necessity to change the setting of the user acceptance requirement of the phase according to the delivery plan of the target vehicle of the program update obtained by the vehicle state obtainer.

5. The center device according to claim 1, wherein
the execution requirement setter changes, as the change of the setting of the user acceptance requirement of the phase, the setting of the user acceptance requirement of an installation phase in which the vehicle master device instructs a rewrite-target electronic control unit to write the update data.

6. The center device according to claim 1, wherein
the execution requirement setter changes, as the change of the setting of the user acceptance requirement of the phase, the setting of an acceptance requirement of an activation phase in which a rewrite-target electronic control unit validates the update data.

7. The center device according to claim 1, wherein
the execution requirement setter sets the execution requirement so that a predetermined phase is executable when the vehicle is in a travelable state.

8. The center device according to claim 1, wherein
the execution requirement setter sets the execution requirement so that a predetermined phase is executable when the vehicle is in a non-travelable state.

9. The center device according to claim 1, wherein
the execution requirement setter sets the execution requirement so that a predetermined phase is unconditionally executable.

10. The center device according to claim 1, wherein
the execution requirement setter sets the execution requirement so that a predetermined phase is unconditionally non-executable.

11. A vehicle electronic control system comprising:
a center device for delivering update data related to a program update, wherein the center device includes:
  (i) a campaign information obtainer obtaining campaign information of the program update,
  (ii) a vehicle state obtainer obtaining a vehicle state of a target vehicle of the program update,
  (iii) an execution requirement setter setting an execution requirement of a phase in the program update based on the campaign information obtained by the campaign information obtainer and the vehicle state obtained by the vehicle information obtainer,
  (iv) an execution requirement notifier notifying the vehicle master device of the execution requirement set by the execution requirement setter, and
  (v) an update data deliverer delivering the update data to the vehicle master device; and
a vehicle master device including:
  (i) an execution requirement obtainer obtaining the execution requirement from the center device,
  (ii) a phase executer executing a phase in the program update based on the execution requirement, and
  (iii) an update data receiver receiving the update data from the center device;
wherein the execution requirement setter determines whether there is a necessity to change a setting of a user acceptance requirement of the phase, and, when it is determined that there is the necessity to change the setting of the user acceptance requirement of the phase, the execution requirement setter changes the setting of the user acceptance requirement of the phase and sets the execution requirement; and
wherein the user acceptance requirement indicates one of
  (a) that user acceptance is not required and a present phase can proceed to a next phase without receiving input indicating an acceptance operation of the user, or
  (b) that user acceptance is required and the present phase cannot proceed to the next phase unless input indicating the acceptance operation of the user is received.

12. A progress control method of a program update in which a center device delivers update data related to the program update to a vehicle master device, the progress control method comprising:
a campaign information obtaining procedure obtaining campaign information of the program update;
a vehicle state obtaining procedure obtaining a vehicle state of a target vehicle of the program update;
an execution requirement setting procedure setting an execution requirement of a phase in the program update based on at least one of: the campaign information obtained by the campaign information obtaining procedure, and the vehicle state obtained by the vehicle state obtaining procedure;
an execution requirement notification procedure notifying the vehicle master device of the execution requirement set by the execution requirement setting procedure; and
an update data delivery procedure delivering the update data to the vehicle master device;
wherein the execution requirement setting procedure determines whether there is a necessity to change a setting of a user acceptance requirement of the phase, and, when it is determined that there is the necessity to change the setting of the user acceptance requirement of the phase, the execution requirement setting procedure changes the setting of the user acceptance requirement of the phase and sets the execution requirement; and
wherein the user acceptance requirement indicates one of
  (a) that user acceptance is not required and a present phase can proceed to a next phase without receiving input indicating an acceptance operation of the user, or
  (b) that user acceptance is required and the present phase cannot proceed to the next phase unless input indicating the acceptance operation of the user is received.

13. A vehicle electronic control system including:
a center device delivering update data related to a program update; and
a vehicle master device executing a phase in the program update,
wherein the center device is configured to perform:
  (i) a campaign information obtaining procedure obtaining campaign information of the program update,
  (ii) a vehicle state obtaining procedure obtaining a vehicle state of a target vehicle of the program update, (iii) an execution requirement setting procedure setting an execution requirement of a phase in the program update based on at least one of: the campaign information obtained by the campaign information obtaining procedure and the vehicle state obtained by the vehicle state obtaining procedure, (iv) an execution requirement notification procedure notifying the vehicle master device of the execution requirement set by the execution requirement setting procedure, and (v) an update data delivery procedure delivering the update data to the vehicle master device; and wherein the vehicle master device is configured to perform:

(i) an execution requirement obtaining procedure obtaining the execution requirement from the center device, (ii) a phase execution procedure executing the phase in program update based on the execution requirement, and (iii) an update data reception procedure receiving the update data from the center device;

wherein the execution requirement setting procedure determines whether there is a necessity to change a setting of a user acceptance requirement of the phase, and, when it is determined that there is the necessity to change the setting of the user acceptance requirement of the phase, the execution requirement setting procedure changes the setting of the user acceptance requirement of the phase and sets the execution requirement; and wherein the user acceptance requirement indicates one of
(a) that user acceptance is not required and a present phase can proceed to a next phase without receiving input indicating an acceptance operation of the user, or
(b) that user acceptance is required and the present phase cannot proceed to the next phase unless input indicating the acceptance operation of the user is received.

14. A non-transitory storage medium storing computer readable instructions including a progress control program for controlling a progress of a program update performed by a center device that delivers, to a vehicle master device, update data related to a program update, the progress control program comprising:

a campaign information obtaining procedure obtaining campaign information of the program update;

a vehicle state obtaining procedure obtaining a vehicle state of a target vehicle of the program update;

an execution requirement setting procedure setting an execution requirement of a phase in the program update based on at least one of: the campaign information obtained by the campaign information obtaining procedure and the vehicle state obtained by the vehicle state obtaining procedure;

an execution requirement notification procedure notifying the vehicle master device of the execution requirement set by the execution requirement setting procedure; and an update data delivery procedure delivering the update data to the vehicle master device;

wherein the execution requirement setting procedure determines whether there is a necessity to change a setting of a user acceptance requirement of the phase, and, when it is determined that there is the necessity to change the setting of the user acceptance requirement of the phase, the execution requirement setting procedure changes the setting of the user acceptance requirement of the phase and sets the execution requirement; and wherein the user acceptance requirement indicates one of
(a) that user acceptance is not required and a present phase can proceed to a next phase without receiving input indicating an acceptance operation of the user, or
(b) that user acceptance is required and the present phase cannot proceed to the next phase unless input indicating the acceptance operation of the user is received.

15. The center device according to claim 1, wherein the phase includes at least two of a campaign notice phase, a download phase, an installation phase, an activation phase, and an update complete confirmation phase.

16. The center device according to claim 15, wherein the phase includes the campaign notice phase and in the campaign notice phase, the center device delivers the campaign information to the vehicle master device.

17. The center device according to claim 16, wherein the phase includes the download phase and in the download phase, the center device delivers a delivery package including write data to the vehicle master device.

18. The center device according to claim 17, wherein the phase includes the installation phase and in the installation phase, a central gateway instructs the vehicle master device to write the write data.

19. The center device according to claim 18, wherein:
the phase includes the activation phase and the update complete confirmation phase;
in the activation phase, the vehicle master device validates the write data; and
in the update complete confirmation phase, a notification of completion of the program update is generated.

* * * * *